United States Patent
Pyeon et al.

(10) Patent No.: US 11,637,462 B2
(45) Date of Patent: Apr. 25, 2023

(54) STATOR AND MOTOR INCLUDING SAME

(71) Applicant: LG INNOTEK CO., LTD., Seoul (KR)

(72) Inventors: Jin Su Pyeon, Seoul (KR); Shung Hun Woo, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 17/656,191

(22) Filed: Mar. 23, 2022

(65) Prior Publication Data

US 2022/0216744 A1    Jul. 7, 2022

Related U.S. Application Data

(63) Continuation of application No. 16/642,280, filed as application No. PCT/KR2018/009003 on Aug. 8, 2018, now Pat. No. 11,316,389.

(30) Foreign Application Priority Data

Aug. 28, 2017  (KR) .......................... 10-2017-0108673
May 8, 2018    (KR) .......................... 10-2018-0052663

(51) Int. Cl.
    *H02K 1/16*     (2006.01)
    *H02K 1/14*     (2006.01)
    *H02K 1/274*    (2022.01)

(52) U.S. Cl.
    CPC ............ *H02K 1/165* (2013.01); *H02K 1/146* (2013.01); *H02K 1/274* (2013.01); *H02K 2213/03* (2013.01)

(58) Field of Classification Search
    CPC ........ H02K 1/165; H02K 1/146; H02K 1/274; H02K 2213/03; H02K 1/278; H02K 1/14; H02K 1/27; Y02T 10/64; B62D 5/04
See application file for complete search history.

(56) References Cited

U.S. PATENT DOCUMENTS

| | | | |
|---|---|---|---|
| 5,757,100 A | 5/1998 | Burgbacher | |
| 6,858,960 B1 | 2/2005 | Muszynski | |
| 2001/0048264 A1 | 12/2001 | Trago et al. | |
| 2005/0258698 A1 | 11/2005 | Miyashita et al. | |

(Continued)

FOREIGN PATENT DOCUMENTS

| | | |
|---|---|---|
| CN | 101330231 A | 12/2008 |
| CN | 103683562 A | 3/2014 |

(Continued)

OTHER PUBLICATIONS

Office Action dated May 10, 2022 in Japanese Application No. 2020-511311.

(Continued)

*Primary Examiner* — Thomas Truong
(74) *Attorney, Agent, or Firm* — Saliwanchik, Lloyd & Eisenschenk

(57) ABSTRACT

An embodiment provides a stator comprising a stator core having a plurality of teeth and coils wound around the teeth, wherein the tooth includes a body around which the coil is wound and a shoe connected to the body, the shoe includes a plurality of grooves and a curvature center of the inner peripheral surface of the shoe is the same as the center of the stator core.

20 Claims, 26 Drawing Sheets

(56) References Cited

U.S. PATENT DOCUMENTS

| | | |
|---|---|---|
| 2006/0290220 A1 | 12/2006 | Ionel et al. |
| 2010/0166579 A1 | 7/2010 | Noh et al. |
| 2010/0264770 A1* | 10/2010 | Braun .................. H02K 21/12 310/156.38 |
| 2010/0283348 A1* | 11/2010 | Okubo .................. H02K 29/03 310/156.47 |
| 2012/0139372 A1 | 6/2012 | Nakano et al. |
| 2014/0252904 A1 | 9/2014 | Mikami et al. |
| 2015/0145370 A1 | 5/2015 | Taniguchi |

FOREIGN PATENT DOCUMENTS

| | | |
|---|---|---|
| CN | 104659937 A | 5/2015 |
| CN | 105141100 A | 12/2015 |
| JP | 2002-272029 A | 9/2002 |
| JP | 2005-341688 A | 12/2005 |
| JP | 2009-136033 A | 6/2009 |
| JP | 2015-70663 A | 4/2015 |
| KR | 10-2010-0076207 A | 7/2010 |
| WO | 2008/050637 A1 | 5/2008 |
| WO | 2011/064834 A1 | 6/2011 |

OTHER PUBLICATIONS

International Search Report in International Application No. PCT/KR2018/009003, filed Aug. 8, 2018.
Office Action dated Jun. 1, 2021 in Chinese Application No. 201880056541.2.
Supplementary European Search Report dated Apr. 29, 2021 in European Application No. 18849992.5.
Office Action dated Feb. 14, 2022 in Korean Application No. 10-2017-0108673.
Office Action dated Sep. 14, 2021 in U.S. Appl. No. 16/642,280.
Notice of Allowance dated Dec. 23, 2021 in U.S. Appl. No. 16/642,280.

* cited by examiner

| Item | Unit | TARGET | COMPARATIVE EXAMPLE | EXAMPLE |
|---|---|---|---|---|
| MW | [%] | - | 0.885 | 0.93 |
| MOF | [mm] | - | 5.3 | 8.8 |
| COGGING TORQUE | [Nm] | Max 0.030 | 0.0158 | 0.001 |
| HIGH SPEED TORQUE RIPPLE | [Nm] | Max 0.027 | 0.1758 | 0.0054 |
| LOW SPEED TORQUE RIPPLE | [Nm] | Max 0.115 | 0.0614 | 0.0130 |
| MAXIMUM TORQUE | [Nm] | Min 3.2 | 3.4527 | 3.2432 |

FIG. 8

| NUMBER OF POLES | NUMBER OF SLOTS | MAIN COGGING ORDER |
|---|---|---|
| 6 | 9 | 18 |

↓

| NUMBER OF POLES | NUMBER OF SLOTS (TWO GROOVES) | MAIN COGGING ORDER |
|---|---|---|
| 6 | 9 | 54 |

|  |  | Unit | Reference | A | B |
|---|---|---|---|---|---|
| ROTOR CORE | | - | Round | Straight | Round |
| NOTCH | | - | 0 | 0 | 2 |
| TORQUE RIPPLE | AVERAGE SPEED | [Nm] | 3.5167 | 3.3770 | 3.3624 |
| | LOW SPEED | [Nm] | 0.0534 | 0.0147 | 0.0384 |
| | HIGH SPEED | [Nm] | 0.0410 | 0.0246 | 0.0432 |
| COGGING TORQUE | Overall | [Nm] | 0.0255 | 0.0044 | 0.0112 |
| | 9TH ORDER | [Nm] | 0.0118 | 0.0238 | 0.0108 |
| | 18TH ORDER | [Nm] | 0.0201 | 0.0036 | 0.0087 |

|  |  | Unit | A | | | B | | |
|---|---|---|---|---|---|---|---|---|
| OUTPUT | Back EMF | [V/rad/sec] | 0.05702 | 0.05702 | 0.05701 | 0.05784 | - | - |
| COGGING TORQUE | Max − Min | [Nm] | 0.0185 | 0.0380 | 0.0307 | 0.0159 | 0.0262 | 0.0160 |
| | 6TH ORDER | [Nm] | 0.0028 | 0.0100 | 0.0038 | 0.0031 | 0.0100 | 0.0020 |
| | 9TH ORDER | [Nm] | 0.0026 | 0.0055 | 0.0107 | 0.0012 | 0.0012 | 0.0003 |
| | 18TH ORDER | [Nm] | 0.0035 | 0.0043 | 0.0037 | 0.0029 | 0.0028 | 0.0044 |

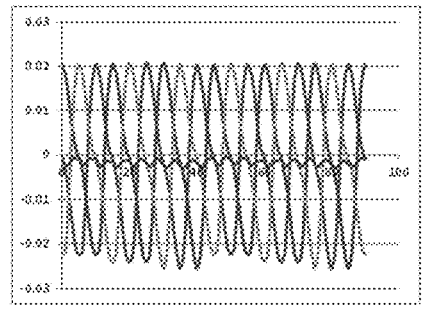
FIG. 23A
140 DEGREES
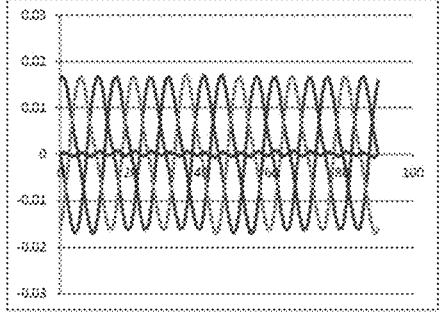
FIG. 23C
145 DEGREES
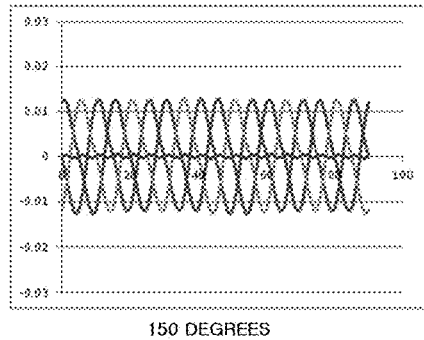
FIG. 23B
150 DEGREES
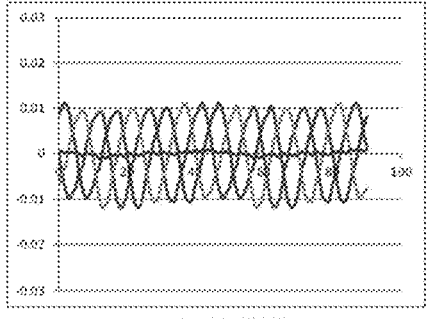
FIG. 23D
155 DEGREES
FIG. 24
|  | Cogging Torque | RATE OF CHANGE | Torque | RATE OF CHANGE |
|---|---|---|---|---|
| COMPARATIVE EXAMPLE 2.0mm | 43.80 | - | 5.94 | - |
| ① W22=1.6mm | 51.80 | 18%↑ | 5.95 | 0.17%↑ |
| ② W22=1.7mm | 37.80 | 13.7%↓ | 5.94 | 0%↓ |
| ③ W22=1.8mm | 37.40 | 14.6%↓ | 5.93 | 0.34%↓ |
| ④ W22=1.9mm | 40.20 | 8.2%↓ | 5.95 | 0.17%↑ |

|  | Cogging Torque | RATE OF CHANGE | Torque | RATE OF CHANGE |
|---|---|---|---|---|
| COMPARATIVE EXAMPLE 2.0mm | 43.80 | - | 5.94 | - |
| ① W22=2.1mm | 19.60 | 55.1%↓ | 5.95 | 0.17%↑ |
| ② W22=2.2mm | 14.60 | 66.7%↓ | 5.93 | 0.34%↓ |
| ③ W22=2.3mm | 55.50 | 26.7%↑ | 5.96 | 0.34%↓ |

| | Cogging Torque | RATE OF CHANGE | Torque | RATE OF CHANGE |
|---|---|---|---|---|
| COMPARATIVE EXAMPLE 0.5mm | 43.80 | - | 5.94 | - |
| ① D=0.45mm | 27.20 | 37.9%↓ | 6.05 | 1.85%↑ |
| ② D=0.40mm | 28.70 | 34.5%↓ | 6.04 | 1.68%↑ |
| ③ D=0.35mm | 34.60 | 21.0%↓ | 6.01 | 1.18%↑ |
| ④ D=0.30mm | 48.70 | 11.2%↑ | 6.02 | 1.35%↑ |

| | Cogging Torque | RATE OF CHANGE | Torque | RATE OF CHANGE |
|---|---|---|---|---|
| COMPARATIVE EXAMPLE 0.5mm | 43.80 | - | 5.94 | - |
| ① D=0.55mm | 31.50 | 28.1%↓ | 6.02 | 1.35%↑ |
| ② D=0.60mm | 27.50 | 37.2%↓ | 6.01 | 1.18%↑ |
| ③ D=0.65mm | 25.40 | 42%↓ | 5.99 | 0.84%↑ |
| ④ D=0.70mm | 48.70 | 3.9%↑ | 5.98 | 0.67%↑ |

|  | Cogging Torque | RATE OF CHANGE | Torque | RATE OF CHANGE |
|---|---|---|---|---|
| COMPARATIVE EXAMPLE 2.0mm | 43.80 | - | 5.94 | - |
| ① W22=1.6mm | 50.30 | 14.8%↑ | 5.95 | 0.17%↑ |
| ②W22=1.7mm | 40.50 | 7.5%↓ | 5.94 | 0% |
| ③W22=1.8mm | 38.20 | 12.8%↓ | 5.93 | 0.17%↓ |
| ④W22=1.9mm | 39.30 | 10.3%↓ | 5.94 | 0% |
| ⑥W22=2.1mm | 21.50 | 50.9%↓ | 5.96 | 0.34%↑ |
| ⑦W22=2.2mm | 20.40 | 53.4%↓ | 5.95 | 0.17%↑ |
| ⑧W22=2.3mm | 59.50 | 35.8%↑ | 5.95 | 0.17%↑ |

| | Cogging Torque | RATE OF CHANGE | Torque | RATE OF CHANGE |
|---|---|---|---|---|
| COMPARATIVE EXAMPLE 0.5mm | 43.80 | - | 5.94 | - |
| ① D=0.30mm | 45.40 | 3.7%↑ | 5.95 | 0.17%↑ |
| ② D=0.35mm | 37.40 | 14.6%↓ | 5.92 | 0.34%↓ |
| ③ D=0.40mm | 34.50 | 21.2%↓ | 5.93 | 0.17%↓ |
| ④ D=0.45mm | 32.50 | 25.8%↓ | 5.94 | 0% |
| ⑤ D=0.55mm | 34.10 | 22.1%↓ | 5.96 | 0.34%↓ |
| ⑥ D=0.60mm | 30.40 | 30.6%↓ | 5.95 | 0.17%↑ |
| ⑦ D=0.65mm | 20.40 | 53.4%↓ | 5.95 | 0.17%↑ |
| ⑧ D=0.70mm | 48.80 | 11.4%↑ | 5.93 | 0.17%↓ |

STATOR AND MOTOR INCLUDING SAME

CROSS-REFERENCE TO RELATED APPLICATIONS

This application is a continuation of U.S. application Ser. No. 16/642,280, filed Feb. 26, 2020, now U.S. Pat. No. 11,316,389, issued Apr. 26, 2022; which is the U.S. national stage application of International Patent Application No. PCT/KR2018/009003, filed Aug. 8, 2018, which claims the benefit under 35 U.S.C. § 119 of Korean Application Nos. 10-2017-0108673, filed Aug. 28, 2017; and 10-2018-0052663, filed May 8, 2018, the disclosures of each of which are incorporated herein by reference in their entirety.

TECHNICAL FIELD

Embodiments relate to a stator and a motor including die same.

BACKGROUND ART

Motors are devices obtaining rotational forces by converting electrical energy into mechanical energy and are widely used in vehicles, household appliances, industrial equipment, and the like.

In particular, an electronic power steering (EPS) system in which the motor is used drives the motor in an electronic control unit according to a driving condition to ensure turning stability and provide a rapid restoring force. Thus, a driver of a vehicle may drive safely.

The motor includes a stator and a rotor. The stator may include teeth forming a plurality of slots, find the rotor may include a plurality of magnets disposed to face the teeth. Adjacent teeth among the teeth are disposed to be spaced apart from each other to form a slot open.

In this case, owing to a difference in permeability between the stator made of a metal material and air of the SO which is an empty space while the rotor rotates, a cogging torque may occur. Since the cogging torque causes noise and vibration, reduction in cogging torque is the most important factor for improving quality of the motor.

However, since performance and quality of the motor may be varied according to a shape of a groove formed in the tooth, the motor is required to be capable of maintaining the performance while reducing the cogging torque through a design of the groove.

DISCLOSURE

Technical Problem

Embodiments are directed to providing a motor capable of reducing a cogging torque.

Further, embodiments are directed to providing a motor capable of improving a quality thereof by reducing a cogging torque through a design with respect to a width and a depth of a groove formed in each tooth on the basis of a slot open.

The problems to be solved by the present invention are not limited to those described above, and other problems not mentioned above should be clearly understood by those skilled in the art from the following description.

Technical Solution

One aspect of embodiments provides a stator including a stator core having a plurality of teeth, and a coil wound around each of the teeth, wherein each of the teeth includes a body around which the coil is wound and a shoe connected to the body, the shoe includes a plurality of grooves, and a curvature center of an inner circumferential surface of the shoe is equal to a center of the stator core.

The grooves may be provided as two grooves.

A width of the groove may be within a range of 90% to 110% of a width of a slot open (SO) of the tooth in a circumferential direction of the stator core.

Another aspect of embodiments provides a motor including a shaft, a rotor including a hole into which the shaft is inserted, and a stator disposed on an outer side of the rotor, wherein the stator includes a stator core having a plurality of teeth, and a coil wound around each of the teeth, each of the teeth includes a body around which the coil is wound and a shoe connected to the body, the shoe includes a plurality of grooves, a curvature center of an inner circumferential surface of the shoe is equal to that of the stator core, the rotor includes a cylindrical rotor core and a plurality of magnets disposed to surround an outer circumferential surface of the rotor core, the magnet has an inner circumferential surface in contact with the outer circumferential surface of the rotor core, and, when an angle formed by the outer circumferential surface of the rotor core divided by the number of the magnets is referred to as a first angle, the magnet has a second angle between a first extension line and a second extension line, which extend from two end points of the inner circumferential surface of the magnet to a center point of the rotor core on transverse cross sections of the rotor core and the magnet, and a ratio of the second angle to the first angle ranges from 0.92 to 0.95.

When a curvature radius of an outer circumferential surface of the magnet is referred to as a first radius, and a curvature radius of the inner circumferential surface of the magnet is referred to as a second radius, the rotor may have a ratio of the first radius to the second radius ranging from 0.5 to 0.7 on the transverse cross sections of the rotor core and the magnet.

The grooves may be provided as two grooves.

The two grooves may be symmetrically disposed on the basis of a reference line passing through a center of a width of the shoe in a circumferential direction and a center of the stator core.

The number of vibrations of a cogging torque waveform may be three times the least common multiple of the number of magnets and the number of the teeth during a unit rotation.

A width of the groove may be within a range of 90% to 110% of a width of a slot open (SO) of the tooth in a circumferential direction of the stator core.

The plurality of magnets may be disposed in one stage on the outer circumferential surface of the rotor core, and the plurality of magnets may be disposed to be spaced a predetermined interval from each other.

Still another aspect of embodiments provides a motor including a shaft, a rotor to which the shaft is coupled, and a stator disposed on an outer side of the rotor, wherein the stator includes a stator core having a plurality of teeth, and a coil wound around each of the teeth, the tooth includes a body part around which the coil is wound, a protrusion disposed on an end portion of the body part, and a groove formed to be concave on an inner surface of the protrusion, and a width (W2) of the groove is 0.85 to 1.1 times a distance (W21) between one end of one protrusion of one tooth among the plurality of teeth and one end of another profusion of another tooth adjacent to the one tooth.

Here, the width (W2) of the groove may be 1.05 to 1.1 times the distance (W21) between the one end of the one protrusion of die one tooth among the plurality of teeth and the one end of the another protrusion of the another tooth adjacent to the one tooth.

A side surface of the protrusion may include a first surface extending from the body part and a second surface extending from the first surface, a depth (D) of the groove may be 0.7 to 1.3 times a length (L) of the second surface in a radial direction, and the length (L) may be ¼ of the distance (W21).

The depth (D) of the groove may be 0.175 to 0.325 times the distance (W21).

Yet another aspect of embodiments provides a motor including a shaft, a rotor to which the shaft is coupled, and a stator disposed on an outer side of the rotor, wherein the suitor includes a suitor core having a plurality of teeth, and a coil wound around each of the teeth, the tooth includes a body part around which the coil is wound, a protrusion disposed on an end portion of the body part, and a groove formed to be concave on an inner surface of the protrusion, a side surface of the protrusion includes a first surface extending from the body part and a second surface extending from the first surface, and a depth (D) of the groove is 0.7 to 1.3 times a length (L) of the second surface based on a radial direction.

Here, the depth (D) of the groove may be 1.1 to 1.3 times the length (L) of the second surface.

The first surface may be formed to have a first inclination with respect to a side surface of the body part, and the second surface may be formed to have a second inclination with respect to the first surface. In this case, the first inclination may be different from the second inclination.

Still yet another aspect of embodiments provides a motor including a shaft, a rotor to which the shaft is coupled, and a stator disposed on an outer side of the rotor, wherein the stator includes a stator core having a plurality of teeth, and a coil wound around each of the teeth, the tooth includes a body part around which the coil is wound, a protrusion disposed on an end portion of the body part, and a groove formed to be concave on an inner surface of the protrusion, a side surface of the protrusion includes a first surface extending from the body part and a second surface extending from the first surface, a width (W2) of the groove is 0.85 to 1.1 times a distance (W21) between one end of one protrusion of one tooth among the plurality of teeth and one end of another protrusion of another tooth adjacent to the one tooth, and a depth (D) of the groove is 0.7 to 1.3 times a length (L) of the second surface based on a radial direction.

Here, a ratio of the width (W2) of the groove to the depth (D) of the groove may range from 3.23 to 3.38.

Still yet another aspect of embodiments provides a motor including a shaft, a rotor to which the shaft is coupled, and a stator disposed on an outer side of the rotor, wherein the stator includes a stator core having a plurality of teeth, and a coil wound around each of the teeth, the tooth includes a body part around which the coil is wound, a protrusion disposed on an end portion of the body part, and a groove formed to be concave on an inner surface of the protrusion, and a depth (D) of the groove is 0.175 to 0.325 times a distance (W21) between one end of one protrusion of one tooth among the plurality of teeth and one end of another protrusion of another tooth adjacent to one tooth.

Meanwhile, a cross section of the groove perpendicular to an axial direction of the shaft of the motor may have a quadrangular shape, and the groove may be provided as two grooves.

A first distance (L21) between the grooves may be equal to a second distance (L22) from one end of the protrusion to the groove.

The two grooves may be symmetrically disposed based on a reference line (CL) passing through a center of a width of the protrusion in a circumferential direction and a center of the body part.

The inner surface may be formed with a predetermined curvature (1/R20) based on a center C of the motor.

In the motor, the magnets of the rotor may be provided as eight magnets, and the teeth of the stator may be provided as twelve teeth.

ADVANTAGEOUS EFFECTS

Embodiments can provide an advantageous effect of significantly reducing a cogging torque by forming a groove in a tooth of a stator to increase a main cogging order.

In accordance with the embodiments, when a groove is disposed in a tooth of a stator in a six-pole nine-slot motor, in a state in which a main cogging order is "ninth order" an advantageous effect of inhibiting a significant increase in cogging torque can be provided.

Further, in accordance with the embodiments, a quality of a motor can be improved by reducing a cogging torque through a design with respect to a width and a depth of a groove formed in each tooth on the basis of a slot open. For example, the motor can reduce the cogging torque by defining the width and the depth of the groove in a relationship with the slot open.

Further, the motor can reduce the cogging torque by defining a depth of the groove in a relationship with a length of a protrusion.

Various beneficial advantages and effects of embodiments are not limited by the detailed description and should be easily understood through detailed descriptions of the embodiments.

DESCRIPTION OF DRAWINGS

FIG. 8 is a table comparing a cogging torque and a torque ripple of Comparative Example with those of Example.

FIGS. 23A-23D show graphs illustrating a variation in cogging torque waveform according to a first inclination between the body part and the protrusion of the stator core disposed in the motor according to the second embodiment.

FIG. 24 is a table showing variations in cogging torque and torque when a width of a groove is 0.85 to 0.95 times a width of a slot open in the motor according to the second embodiment.

MODES OF THE INVENTION

Figure 1:
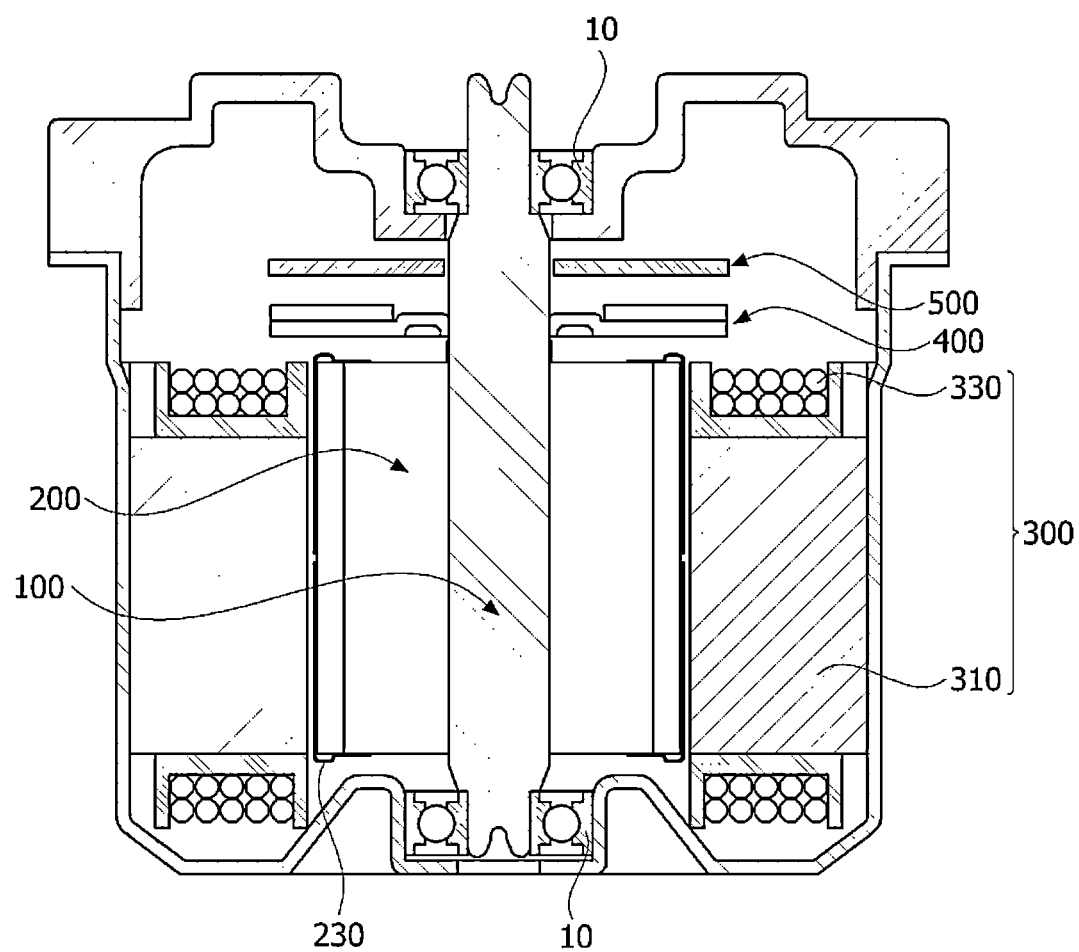
FIG. 1 is a diagram illustrating a motor according to a first embodiment.

Hereinafter, exemplary embodiments of the present invention will be described in detail with reference to the accompanying drawings.

However, the technical idea of the present invention is not limited to some embodiments described but may be implemented in various different forms, and one or more components between the embodiments may be selectively combined and substituted without departing from the technical scope of the present invention.

Further, unless specifically defined and described, terms used in the embodiments of the present invention (including technical and scientific terms) may be construed as meanings which are generally understood by those skilled in the art to which the present invention pertains, and generally used terms such as terms defined in the dictionary may be interpreted in consideration of the contextual meaning of the related art.

Further, terms used herein are intended to describe embodiments and are not intended to limit the present invention.

In the present disclosure, the singular forms may include the plural forms unless the context clearly dictates otherwise, and, when a description is made as "at least one (or more) of A and B, and C," it may include one or more of all combinations which can be combined with A, B, and C.

Further, in describing components of embodiments of the present invention, the terms first, second, A, B, (a), (b), and the like can be used.

These terms are intended to distinguish one component from other components, but the nature and the order or sequence of the components is not limited by those terms.

Further, when a component is described as being "connected," "coupled," or "linked" to another component, it may include not only the component is directly connected, coupled, or connected to another component, but also the component may be "connected," "coupled," or "linked" to another component through still another component therebetween.

Further, when a component is described as being formed or disposed "on (above) or under (below)" of another component, the term "on (above) or under (below)" includes not only when two components are in direct contact with each other, but also when one or more of still another component is formed or disposed between the two components. Also, when described as being "on (above) or under (below)," the term "on (above) or under (below)" may mean not only an upward direction but also a downward direction based on one component.

Hereinafter, embodiments of the present invention will be described in detail with reference to the drawings, the same reference numerals are given to the same or corresponding components regardless of a number of the drawing, and duplicate descriptions thereof will be omitted herein.

Figure 2:
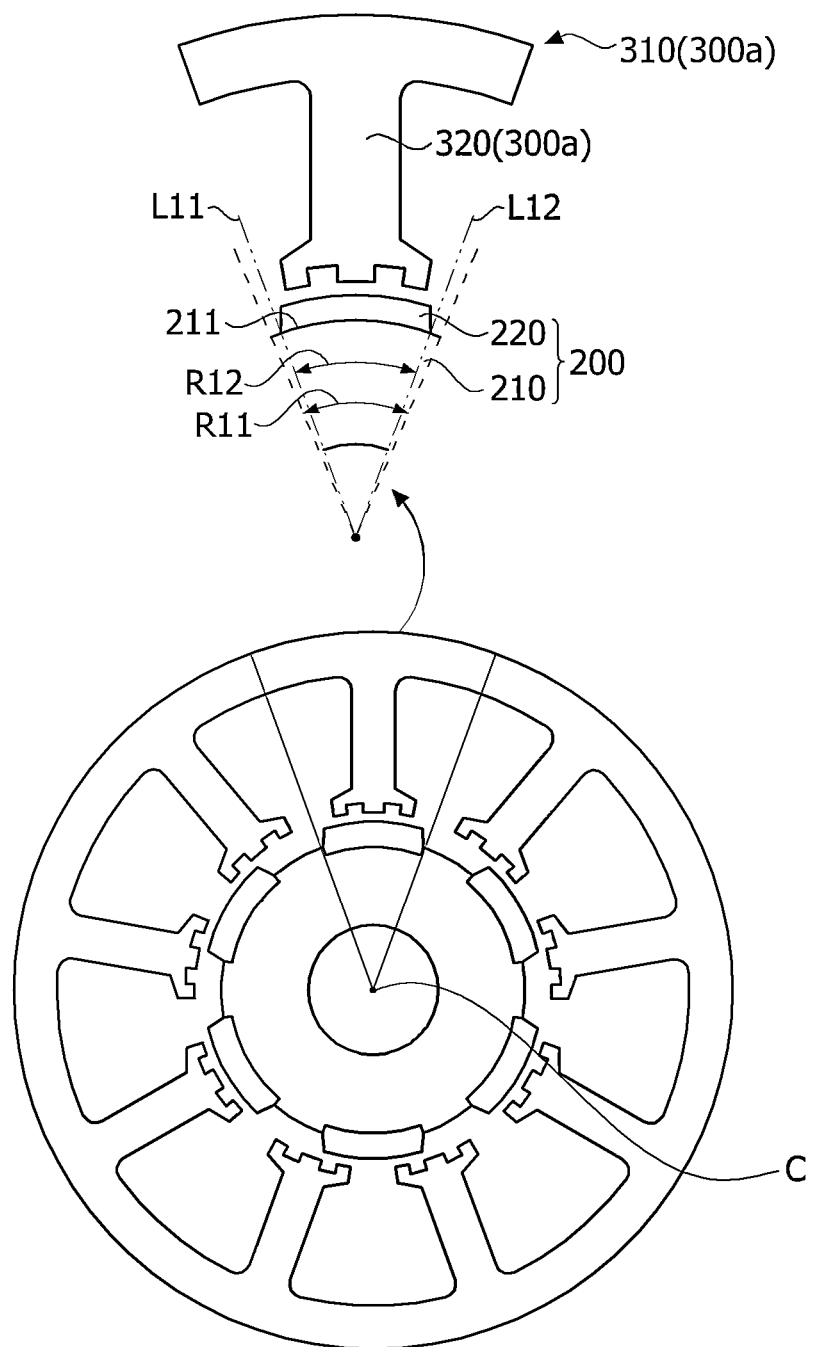
FIG. 2 is a diagram illustrating a first angle and a second angle.
Figure 3:
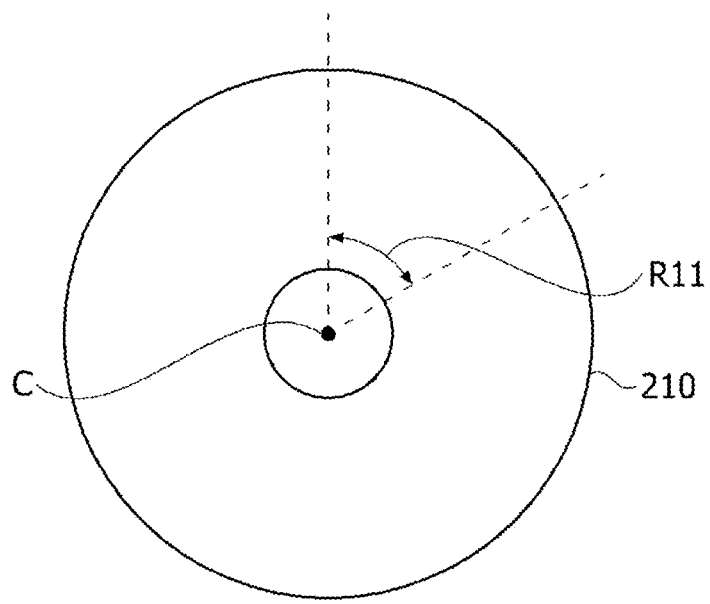
FIG. 3 is a diagram illustrating the first angle.

FIG. 1 is a diagram illustrating a motor according to a first embodiment, FIG. 2 is a diagram illustrating a first angle and a second angle, and FIG. 3 is a diagram illustrating the first angle.

Referring to FIGS. 1 to 3, a motor 1 according to the first embodiment may include a shaft 100, a rotor 200, and a stator 300.

The shaft 100 may be coupled to tire rotor 200. When an electromagnetic interaction occurs in the rotor 200 and the stator 300 through a supply of a current, the rotor 200 rotates and thus the shaft 100 is rotated by being interlocked with the rotation of the rotor 200. The shaft 100 may be connected to a steering shaft of a vehicle to transmit power to the steering shaft. The shaft 100 may be supported on a bearing.

The rotor 200 rotates due to an electrical interaction with the stator 300. The rotor 200 is disposed in the stator 300. The rotor 200 may include a rotor core 210 and a magnet 220 coupled to the rotor core 210. The rotor 200 may be implemented as a type in which the magnet 220 is coupled to an outer circumferential surface of the rotor core 210. In such a type of the rotor 200, in order to inhibit separation of the magnet 220 and increase a coupling force, a separate can member 230 may be coupled to the rotor core 210. Alternatively, the rotor 200 may be integrally formed with the magnet 220 and the rotor core 210 through dual injection of the magnet 220 and the rotor core 210.

The rotor 200 may be implemented in a type in which a magnet is coupled to an interior of the rotor core. Such a type of the rotor 200 may be provided with a pocket into which the magnet 220 is inserted in the rotor core 210.

Meanwhile, the rotor 200 may be configured such that the magnet 220 is disposed in the rotor core 210, which is a single cylindrical product, in one stage. Here, the one stage refers to a structure in which the magnet 220 may be disposed such that a skew is not present on an outer circumferential surface of the rotor 200. Therefore, a height of the rotor core 210 may be formed to be equal to that of the magnet 220 based on a longitudinal cross section of the rotor core 210 and a longitudinal cross section of the magnet 220. That is, the magnet 220 may be implemented to cover an entirety of the rotor core based on a height direction (axial direction). Here, the axial direction may be a length direction of the shaft 100.

The stator 300 may be disposed on an outer side of the rotor 200. The stator 300 causes an electrical interaction with the rotor 200 to induce a rotation of the rotor 200.

A sensing magnet 400 is a device coupled to the shaft 100 so as to be interlocked with the rotor 200 to detect a position of the rotor 200. Such a sensing magnet may include a magnet and a sensing plate. The magnet may be coaxially coupled to the sensing plate. The sensing magnet 400 may include a main magnet disposed adjacent to a hole forming an inner circumferential surface in a circumferential direction and a sub-magnet formed at an edge of the main magnet. The main magnet may be arranged equal to a drive magnet inserted into the rotor of the motor. The sub-magnet is more subdivided than the main magnet and comprised of many poles. Thus, a rotation angle may be further divided and measured, and driving of the motor may be made smoother.

The sensing plate may be formed of a metal material in the form of a disc. The sensing magnet may be coupled to an upper surface of the sensing plate. Further, the sensing plate may be coupled to the shaft 100. A hole through which the shaft 100 passes is formed in the sensing plate.

A sensor for detecting a magnetic force of the sensing magnet may be disposed on a printed circuit board (PCB) 500. In this case, the sensor may be a Hall integrated circuit (IC). The sensor detects variations in a north pole and a south pole of the main magnet or the sub-magnet to generate a sensing signal. The PCB 500 may be coupled to a lower surface of a cover of a housing and installed above the sensing magnet such that the sensor faces the sensing magnet.

The motor 1 according to the first embodiment may reduce a cogging torque and a torque ripple by reducing a width of the magnet 220 to increase a frequency of the cogging torque waveform per unit period. A detailed description thereof is as follows. In describing the embodiment, the width of the magnet 220 may be defined as a length of an arc formed by an inner circumferential surface of the magnet 220 in contact with the rotor core 210.

Referring to FIGS. 2 and 3, a plurality of magnets 220 are attached to the outer circumferential surface of the rotor core 210. Further, the stator 300 may include a plurality of teeth 320. The magnet 220 may be disposed to face the tooth 320.

For example, the motor 1 may be a six-pole nine-slot motor including six magnets 220 and nine teeth 320. The number of the teeth 320 corresponds to the number of the slots. Further, a north pole and a south pole of the magnet 220 may be alternately disposed in a circumferential direction of the rotor core 210.

An inner circumferential surface 211 of the magnet 220 is in contact with the outer circumferential surface of the rotor core 210. The width of the magnet 220 of the motor 1 according to the first embodiment may be described through a first angle R11 and a second angle R12.

First, the first angle R11 represents an angle obtained by dividing 360 degrees, which are angles formed by the outer circumferential surface of the rotor core 210, by the number of the magnets 220. For example, when the number of the magnets 220 is six, the first angle R11 is 60 degrees. An arc length of the rotor core 210 corresponding to the first angle R11 becomes a reference for setting the width of the magnet 220. In this ease, an actual width of the magnet 220 may lie formed on the outer circumferential surface of the rotor core 210 to be increased or decreased in consideration of a width of a protrusion for guiding the magnet 220.

Next, the second angle R12 means an angle between a first extension line L11 and a second extension line L12. Here, the first extension line L11 means an imaginary line extending from an end point of any one side of the inner circumferential surface 211 to a central point C of the rotor core 210 on a transverse cross section of the magnet 220. Here, the transverse cross section of the magnet 220 means a cross section of the magnet 220 cut in a direction perpendicular to the axial direction of the motor.

The arc length of the rotor core 210 corresponding to the second angle R12, which is an angle between the first extension line L11 and the second extension line L12, becomes another reference for setting the width of the magnet 220.

The first angle R11 becomes a conventional reference angle for setting the width of the magnet 220, and the second angle R12 becomes a reference angle for setting the width of the magnet 220 to have a width that is smaller than that of the magnet 220 based on the first angle R11.

Figure 4:
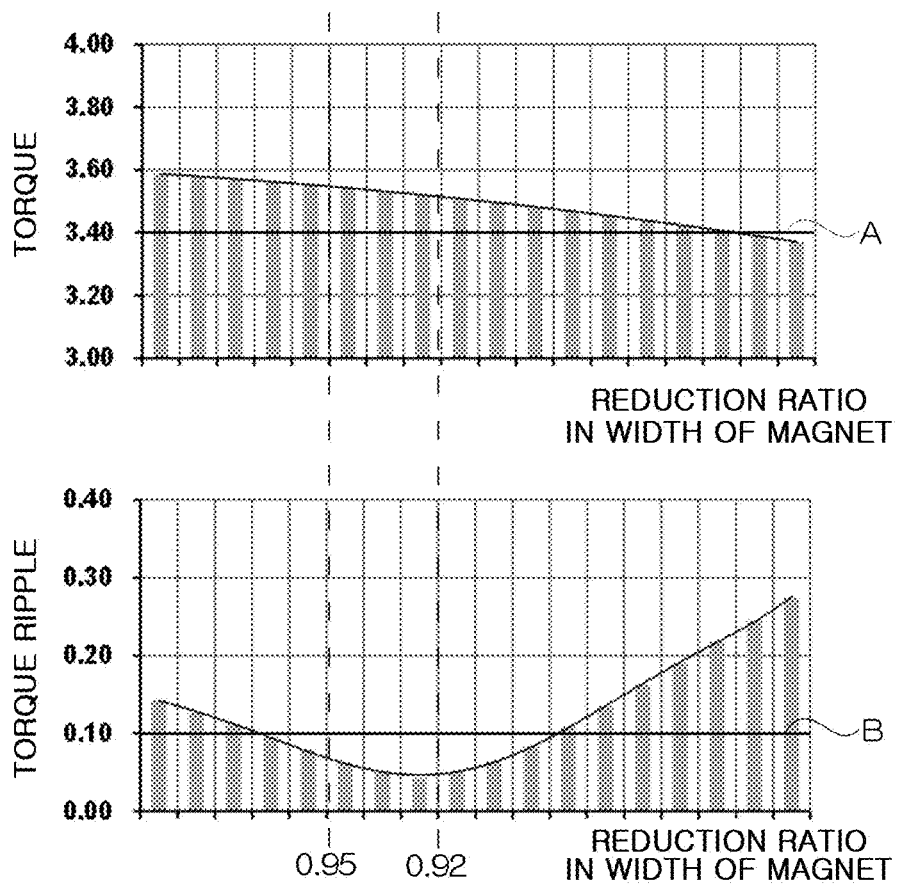
FIG. 4 shows graphs illustrating comparison of values of a torque and a torque ripple which correspond to a reduction ratio of a width of a magnet.

FIG. 4 shows graphs illustrating comparison of values of a torque and a torque ripple which correspond to a reduction ratio of a width of a magnet.

Referring to FIG. 4, in the case of the six-pole nine-slot motor, it can be seen that a torque ripple which is lower than a reference line B representing a target torque ripple was measured at a point at which a ratio of the second angle R12 to the first angle R11 ranges from 0.92 to 0.95.

Further, it can be seen that a torque was measured to be higher than a reference line A representing a target reference torque at a point at which the ratio of the second angle R12 to the first angle R11 ranges from 0.92 to 0.95 so that the measured torque satisfied a required torque.

Figure 5:
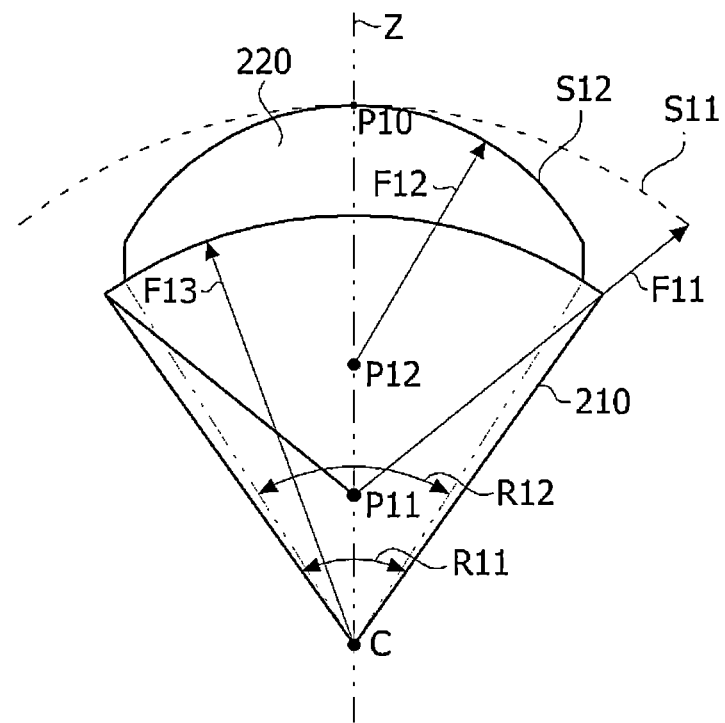
FIG. 5 is a diagram illustrating an optimum shape of an outer circumferential surface of a magnet for reducing a torque ripple.

FIG. 5 is a diagram illustrating an optimum shape of an outer circumferential surface of the magnet for reducing a torque ripple.

Referring to FIG. 5, a point on an outer circumferential surface of the magnet 220, which is farthest from the center C or the rotor core 210 to the outer circumferential surface of the magnet 220, is referred to as P10 of FIG. 5. An imaginary reference line connecting the center C of the rotor core 210 to P10 of FIG. 5 is referred to as Z of FIG. 5.

Generally, the outer circumferential surface of the magnet 220 is designed to be disposed along S11 of FIG. 5. S11 of FIG. 5 is a line representing a circumference having a radius F11 from a first origin point P11 away from the center C to P10 of FIG. 5 on the reference line Z of FIG. 5.

Meanwhile, the outer circumferential surface of the magnet 220 of the rotor according to the embodiment is designed to be disposed along S12 of FIG. 5. S12 of FIG. 5 is a line representing a circumference having a first radius F12 from a second origin point P12 away from the center C to P10 of FIG. 5 on the reference line Z of FIG. 5. Here, the second origin point P12 is disposed on an outer side of the first origin point P11 in a radial direction of the rotor core 210.

The shape of the outer circumferential surface of the magnet 220 is for reducing a torque ripple in a high speed condition.

Figure 6:
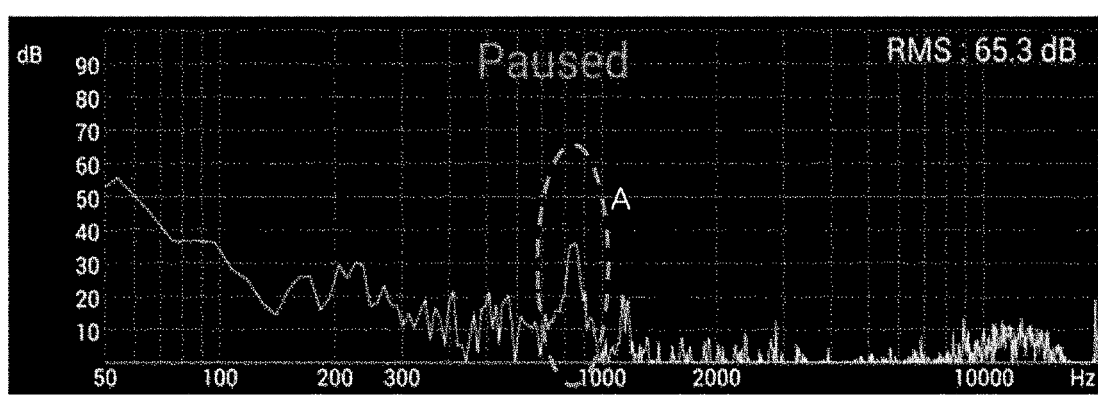
FIGS. 6 and 7 are graphs showing torque ripples occurring in a high speed rotation condition.
Figure 7:
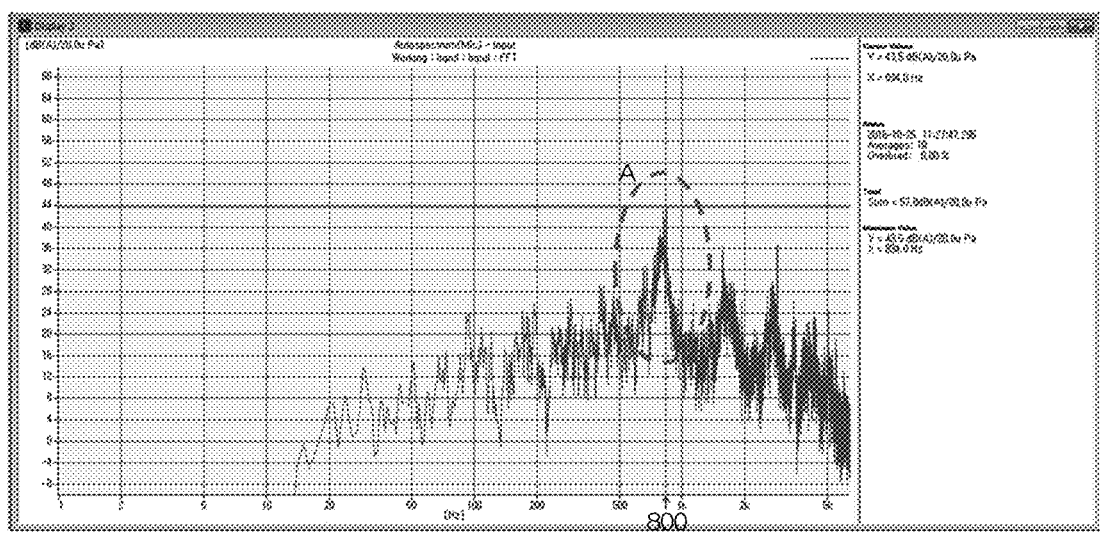

FIGS. 6 and 7 are graphs showing torque ripples occurring in a high speed rotation condition.

Referring to FIGS. 6 and 7, in the case of a motor including a magnet of which an outer circumferential surface is formed along S11 of FIG. 5, as shown in Region A of FIG. 6 and Region A of FIG. 7, it can be confirmed that noise was significantly increased in an 800 Hz band. 800 Hz represents a state in which the motor rotates at 2900 revolution per minute (RPM), and it can be seen that the torque ripple was significantly increased in a high speed rotation.

Referring to FIG. 5, in order to reduce the torque ripple in the rotor according to the embodiment, the shape of the outer circumferential surface of the magnet 220 is changed so as to have a curvature radius that is smaller than that of a general magnet such as S12 of FIG. 5.

In particular, when a second radius F13 is 1, the magnet 220 may be designed such that the first radius F12 ranges from 0.5 to 0.7. Here, the first radius F12 is a curvature radius of the outer circumferential surface of the magnet 220 and is a distance from the second origin point P12 to P of FIG. 5. The second radius F13 corresponds to a curvature radius of the inner circumferential surface of the magnet 220.

For example, when a distance from the center C of the rotor core 210 to P10 of FIG. 5 is 20 mm, the first radius F12 may be 11.2 mm, and the second radius F13 may be 17.2 mm. Therefore, a distance from the center C of the rotor core 210 to the second origin point P12 corresponds to 8.8 mm.

In the above conditions, measured results of a cogging torque and a torque ripple of the six-pole nine-slot motor are as follows.

FIG. 8 is a table comparing a cogging torque and a torque ripple of Comparative Example with those of Example.

Referring to FIG. 8, MW of FIG. 8 represents a ratio of the second angle R12 to the first angle R11, and MOF of FIG. 8 means a distance from the center C of the rotor core 210 to the second origin point P12.

In the case of Comparative Example, conditions are such that the ratio of the second angle R12 to the first angle R11 is 0.885, and the distance from the center C of the rotor core 210 to the second origin point P12 is 5.3 mm.

In the ease of Example, conditions are such that the ratio of the second angle R12 to the first angle R11 is 0.93, and the distance from the center C of the rotor core 210 to the second origin point P12 is 8.8 mm.

In the above conditions, measured results of the cogging torques, the torque ripples, and the torque of Comparative Example and Example are as follows.

First, it is shown that there was no significant difference between a maximum torque of Comparative Example and that of Example. However, it is shown that the cogging torque and the torque ripple were significantly reduced. In particular, it is shown that a high speed torque ripple was significantly reduced from 0.1758 Nm (Comparative Example) to 0.0054 Nm (Example). This is exhibited as being much lower than a target reduction value of the torque ripple.

Figure 9:
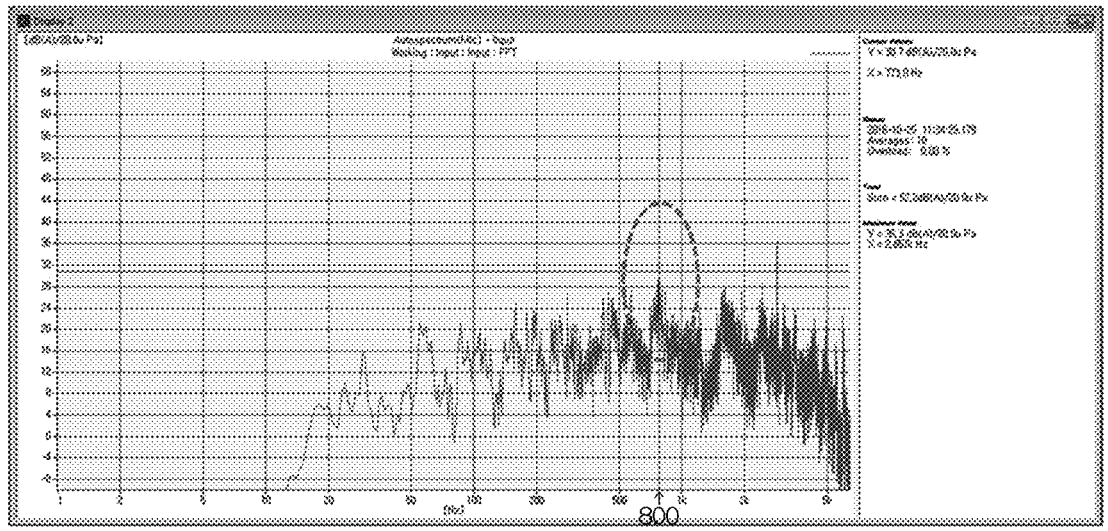
FIG. 9 is a graph showing a torque ripple of the motor according to the first embodiment in a high speed rotation condition.

FIG. 9 is a graph showing a torque ripple of the motor according to the first embodiment in a high speed rotation condition.

Referring to FIG. 9, unlike Region A of FIG. 7, noise was significantly reduced in the 800 Hz band and thus the torque ripple was reduced.

Figure 10:
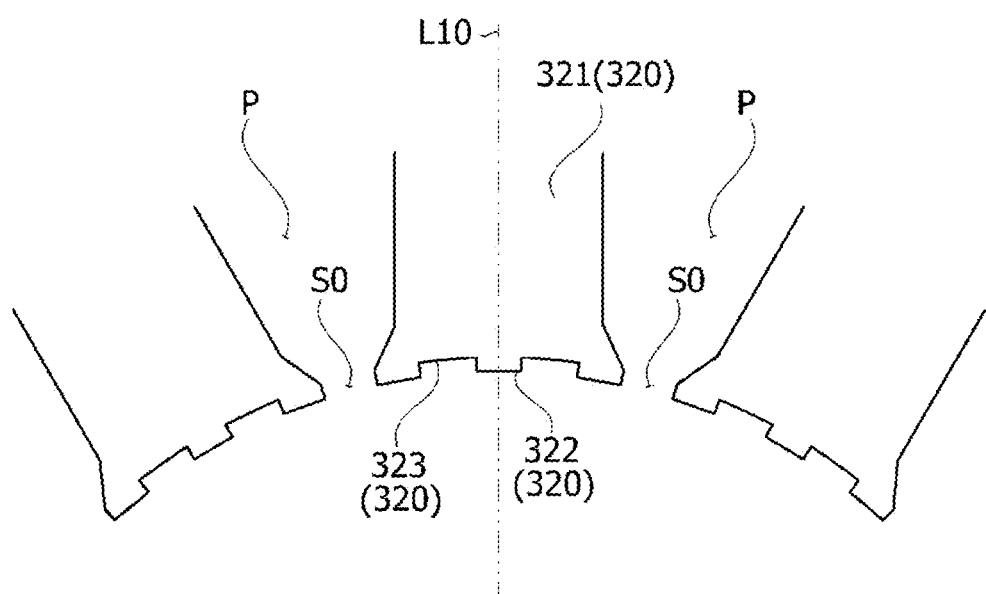
FIG. 10 is a diagram illustrating a groove of a tooth.

FIG. 10 is a diagram illustrating a groove of a tooth.

Referring to FIGS. 1 and 10, the stator 300 may include a stator core 300a and a coil 330.

The stator core 300a may be formed by stacking a plurality of plates in the form of a thin steel sheet. Alternatively, the stator core 300a may be formed by coupling or connecting a plurality of divided cores.

An annular yoke 310 may be provided in the stator core 300a, and a tooth 320 protruding from the yoke 310 toward a center of the stator core 300a may be provided. The coil 330 is wound around the tooth 320. A plurality of teeth 320 may be disposed along an inner circumferential surface of the annular yoke 310 at regular intervals. Although nine teeth 320 in total are shown in FIG. 2, the present invention is not limited thereto and may be variously modified according to the number of poles of the magnet 220.

The magnet 220 may be attached to the outer circumferential surface of the rotor core 210. A distal end of the tooth 320 is disposed to face the magnet 220.

Referring to FIG. 10, the tooth 320 may include a body 321 and a shoe 322. The coil 330 of FIG. 1 is wound around the body 321. The shoe 322 is disposed on a distal end of the body 321. A distal end surface of the shoe 322 is disposed to face the magnet 220. A winding space P of the coil 330 of FIG. 1 is formed between adjacent teeth 320. The shoes of adjacent teeth 320 are disposed to be spaced apart from each other to form a slot open (SO). The SO is an inlet of the winding space P and a nozzle for winding the coil is inserted into the SO. Here, the body 321 of the tooth 320 may be referred to as a first body.

An inner circumferential surface of the shoe 322 may include a groove 323. The groove 323 may be formed to be concave on the inner circumferential surface of the shoe 322. A shape of the groove 323 is shown as a square shape, but the present invention is not limited thereto. Further, the groove 323 may be disposed in an axial direction of the stator core 300a. In other words, the groove 323 may be disposed to be long from an upper end to a lower end of the stator core 300a in a height direction of the stator core 300a.

Two grooves 323 may be disposed. Referring to FIG. 10, the two grooves 323 may be symmetrically disposed based on a reference line L passing through a center of a width of the body 321 of the tooth 320 and the center C of the stator core 300a. The groove 323 serves to correspond to the SO causing a variation in magnetic flux density, thereby increasing a frequency of a waveform of a cogging torque per unit period to serve to significantly reduce the cogging torque.

Figures 11, 12:
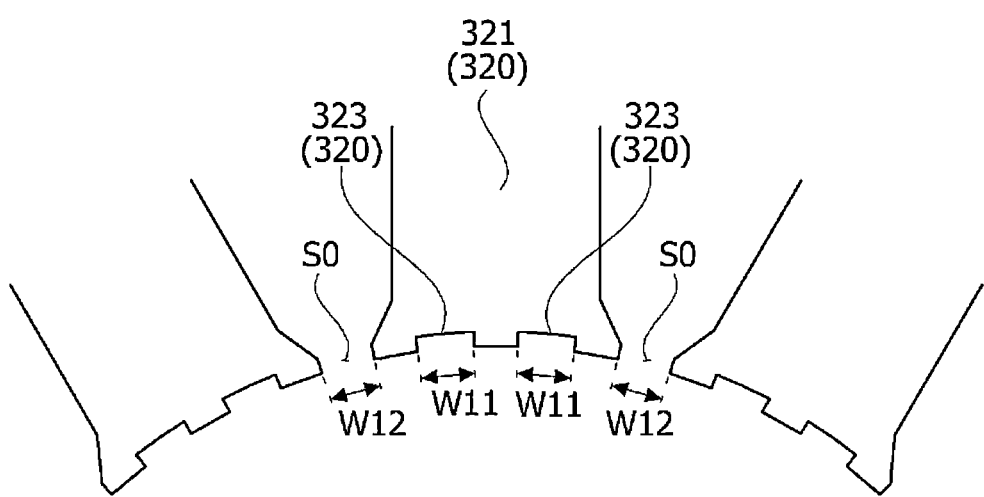
FIG. 11 is a table showing a main cogging order increased by the motor according to the first embodiment.
FIG. 12 is a diagram illustrating a width of the groove.

FIG. 11 is a table showing a main cogging order increased by the motor according to the first embodiment.

Referring to FIG. 11, in the case of the six-pole nine-slot motor, a main cogging order corresponds to eighteen which is the least common multiple of six that is the number of the magnets 220 and nine that is the number of slots. Here, the main cogging order means the number of vibrations of the cogging torque waveform per unit rotation (one revolution) of the motor. Here, the number of vibrations represents the number of repetitions of a cogging torque waveform forming a peak. Further, the number of the slots corresponds to the number of the teeth 320.

In the case of the six-pole nine-slot motor with the two grooves 323, since the number of the slots may be regarded as increasing from nine to twenty-seven due to the two grooves 323, the main cogging order is increased three times from 18 to 54. As described above, since the increase of the main cogging order three times due to the two grooves 323 means that the number of vibrations of the cogging torque waveform is increased three times, the cogging torque may be significantly reduced.

Figure 13A:
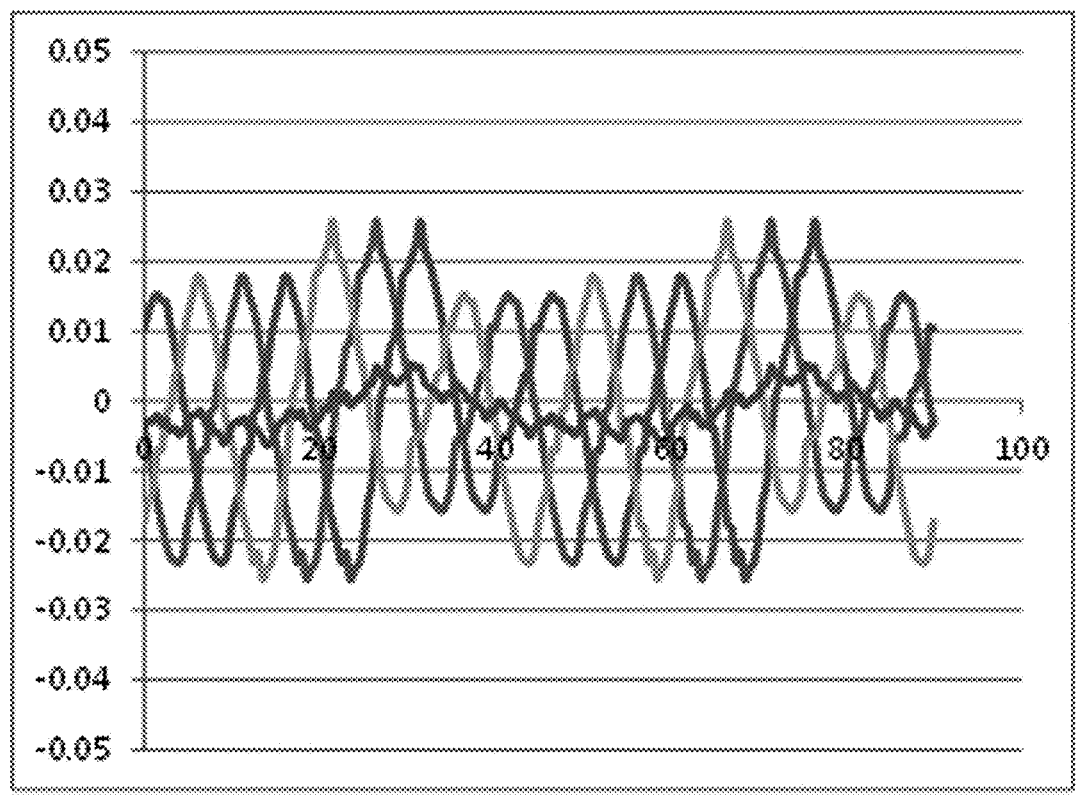
FIGS. 13A and 13B show graphs illustrating a variation in cogging torque waveform according to the width of the groove.
Figure 13B:
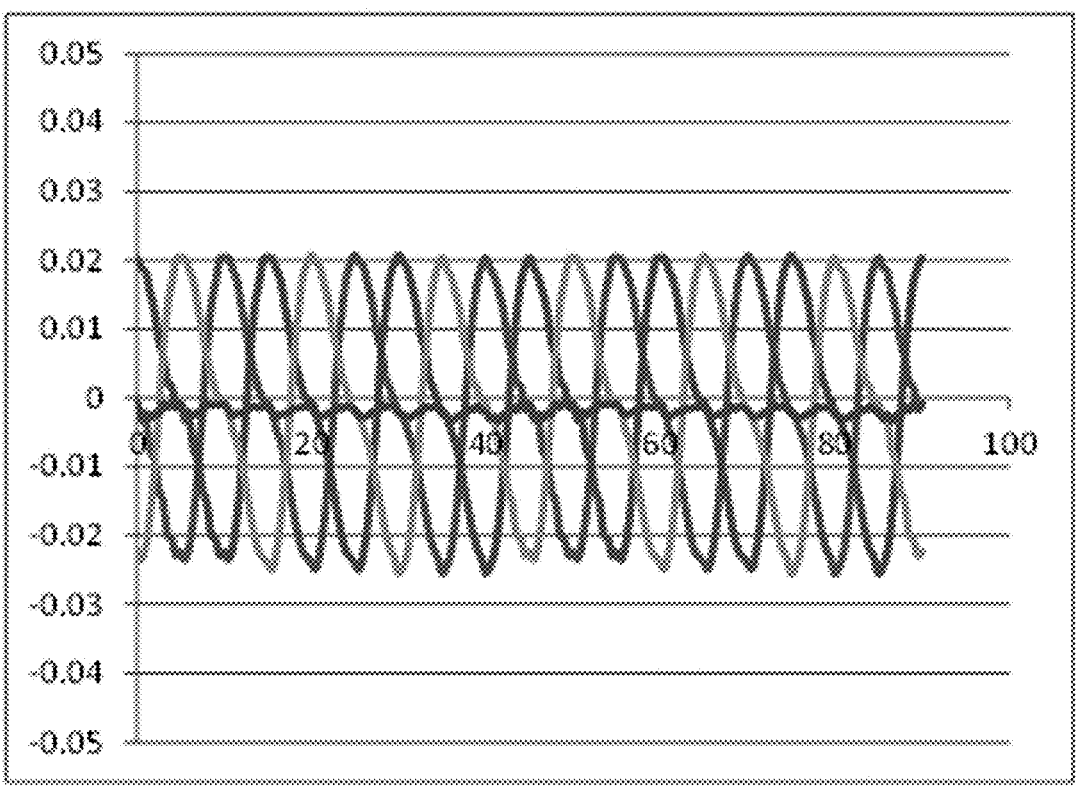

FIG. 12 is a diagram illustrating a width of the groove, and FIGS. 13A and 13B show graphs illustrating a variation in cogging torque waveform according to the width of the groove. Referring to FIGS. 12, 13A, and 13B, a width W11 of the groove 323 is set to be within 90% to 110% of a width W12 of the SO. Here, the width W11 of the groove 323 means a distance from one side end of an inlet of the groove 323 to the other side end thereof based on a circumferential direction of the stator core 310. Mere, the width W12 of the SO means a distance from one side end of an inlet of the SO to the other side end thereof based on the circumferential direction of the stator core 310.

As shown in FIG. 13A, when the width W11 of the groove 323 deviates from 90% to 110% of the width W12 of the SO, there occurs a problem that a component of the stator, i.e., the main cogging order that is equal to the number of poles of the magnet 220, is included in the cogging torque waveform.

However, as shown in FIG. 13B, when the width W11 of the groove 323 is within 90% to 110% of the width W12 of the SO, it can be confirmed that only the cogging torque waveform corresponding to a main cogging order of "54" was detected.

When the groove 323 is included in the shoe 322, in a suite in which the rotor 200 with no skew is included and a main cogging order is "9," there is a problem that a magnitude and dispersion of the cogging torque are expanded.

Figures 14, 15:
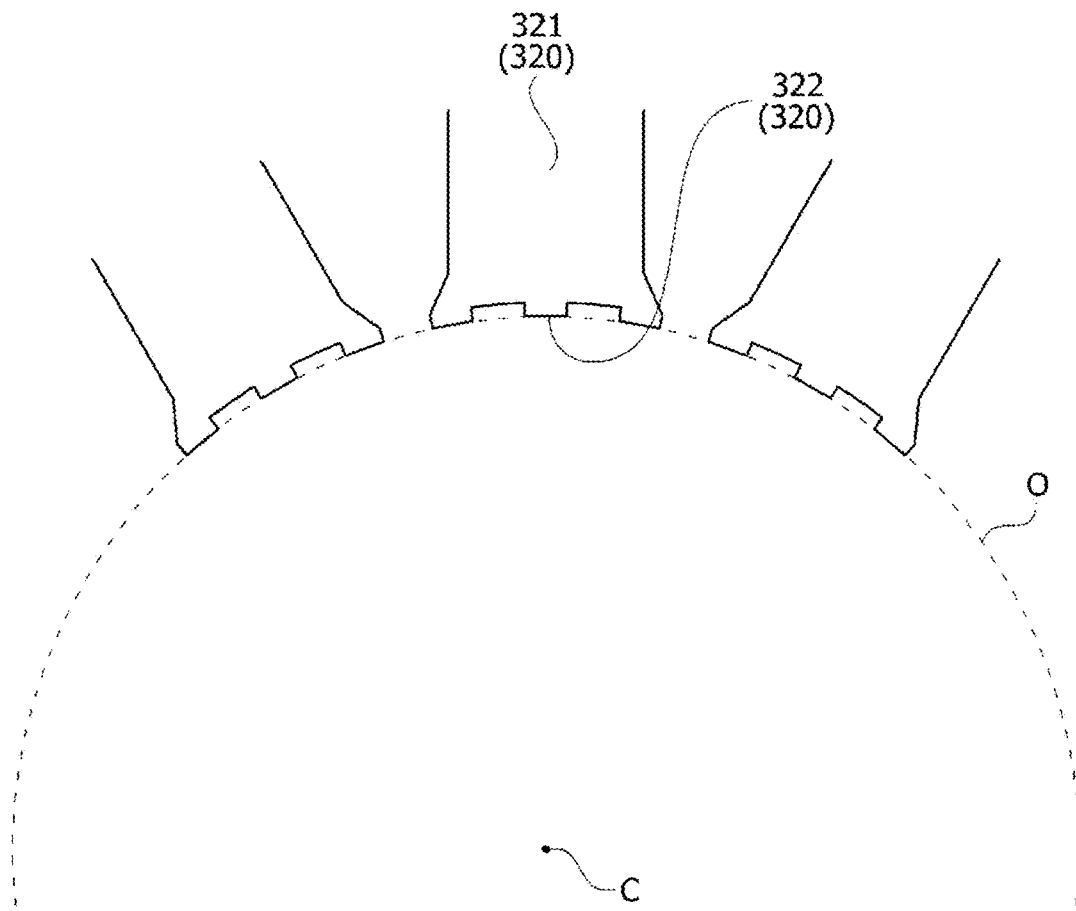
FIG. 14 is a diagram illustrating a shoe having an inner circumferential surface formed of a curved surface.
FIG. 15 is a table comparing a cogging torque of a motor in which an inner circumferential surface of the shoe is formed of a flat surface with a cogging torque of a motor of which a curvature center of an inner circumferential surface of a shoe coincides with a center of a stator core.

FIG. 14 is a diagram illustrating a shoe having an inner circumferential surface formed of a curved surface.

Referring to FIG. 14, the motor 1 according to the first embodiment is formed such that the curvature center of the inner circumferential surface of the shoe 322 coincides with the center C of the stator core 310 of FIG. 2. In particular, a center of an imaginary circle O connecting the inner circumferential surfaces of the plurality of shoes 322 coincides with the center C of the stator core 310 of FIG. 2.

FIG. 15 is a table comparing a cogging torque of a motor in which an inner circumferential surface of the shoe is formed of a flat surface with a cogging torque of a motor of which a curvature center of an inner circumferential surface of a shoe 322 coincides with a center of tire stator core 310.

An column A of FIG. 15 represents a case in which the inner circumferential surface of the shoe is a flat surface in a motor including six poles and nine slots and a rotor with no skew. Further, an column B of FIG. 15 represents a case in which the a curvature center of the inner circumferential surface of the shoe coincides with the center C of the stator core 310 in the motor including six poles and nine slots and a rotor with no skew.

Referring to die column A of FIG. 15, there was an effect of significantly reducing the cogging torque at an 18th main cogging order, but a problem occurred in that the cogging torque is significantly increased more than a reference value at a 0th main cogging order.

Referring to the column B of FIG. 15, it can be confirmed that there was an effect of reducing the cogging torque more than the reference value at the 18th main cogging order and even at the 9th main cogging order.

Figures 16, 17:
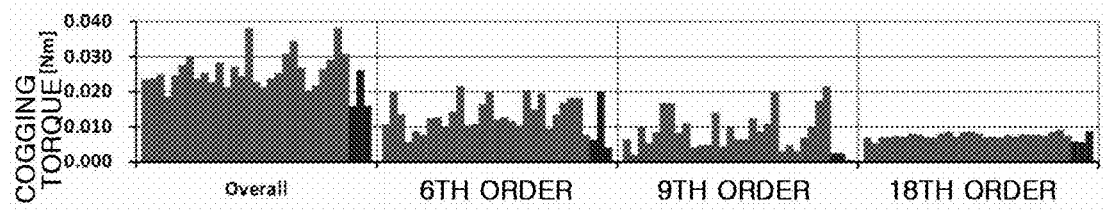
FIG. 16 is a table comparing a deviation and an output of the cogging torque of the motor in which the inner circumferential surface of the shoe is a Hat surface with those of the cogging torque of the motor of which the curvature center of the inner circumferential surface of the shoe coincides with the center of the stator core.
FIG. 17 is a graph showing a cogging torque improvement state corresponding to a main cogging order in the motor according to the first embodiment.

FIG. 16 is a table comparing a deviation and an output of the cogging torque of the motor in which the inner circumferential surface of the shoe is a flat surface with those of the cogging torque of the motor of which the curvature center of the inner circumferential surface of the shoe 322 coincides with the center C of the stator core 310.

An column A of FIG. 16 represents a case in which the inner circumferential surface of the shoe is a flat surface in a motor including six poles and nine slots and a rotor with no skew. Further, an column B of FIG. 16 represents a case in which the curvature center of the inner circumferential surface of the shoe coincides with the center C of the stator core 310 in the motor including six poles and nine slots and a rotor with no skew.

Referring to the column A of FIG. 16, as a result of three sample tests, it can be seen that a deviation between a maximum value (0.0107 N/m) and a minimum value (0.0028 N/m) of the cogging torque was very large at the 9th main cogging order.

Meanwhile, referring to the column B of FIG. 16, as the result of the three sample tests, it can be seen that a deviation between a maximum value (0.0012 N/m) and a minimum value (0.0003 N/m) of the cogging torque was not relatively large at the 9th main cogging order.

Further, in the column B of FIG. 16, it can be confirmed that an output was increased more than that of the column A of FIG. 16 by as much as about 1%.

FIG. 7 is a graph showing a cogging torque improvement state corresponding to a main cogging order in the motor according to the first embodiment.

A red bar in FIG. 17 indicates a cogging torque when the inner circumferential surface of the shoe is a flat surface in the motor including six poles and nine slots, and a rotor with no skew. A blue bar in FIG. 17 indicates a cogging torque when the curvature center of the inner circumferential surface of the shoe coincides with the center C of the stator core 310 in the motor including six poles and nine slots, find the rotor with no skew.

Referring to FIG. 17, the cogging torque indicated by the red bar and the coating torque indicated by the blue bar were not significantly different from each other at a 6th main cogging order and the 18th main cogging order. On the other hand, it can be confirmed that, at the 9th main cogging order, the coating torque indicated by the blue bar was significantly reduced as compared with the cogging torque indicated by the red bar so that reduction performance of the cogging torque was significantly improved.

Figure 18:
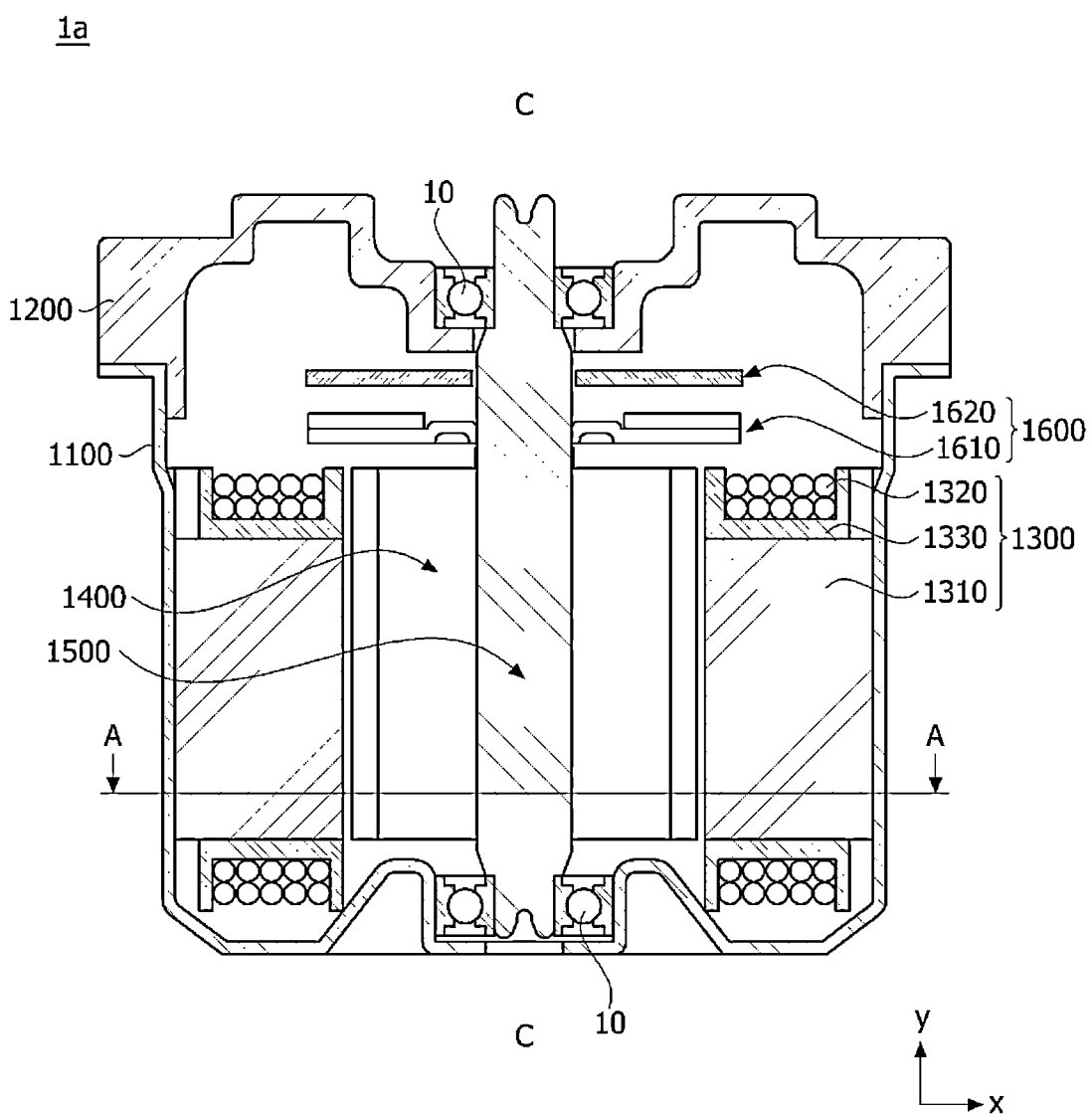
FIG. 18 is a diagram illustrating a motor according to a second embodiment.
Figure 19:
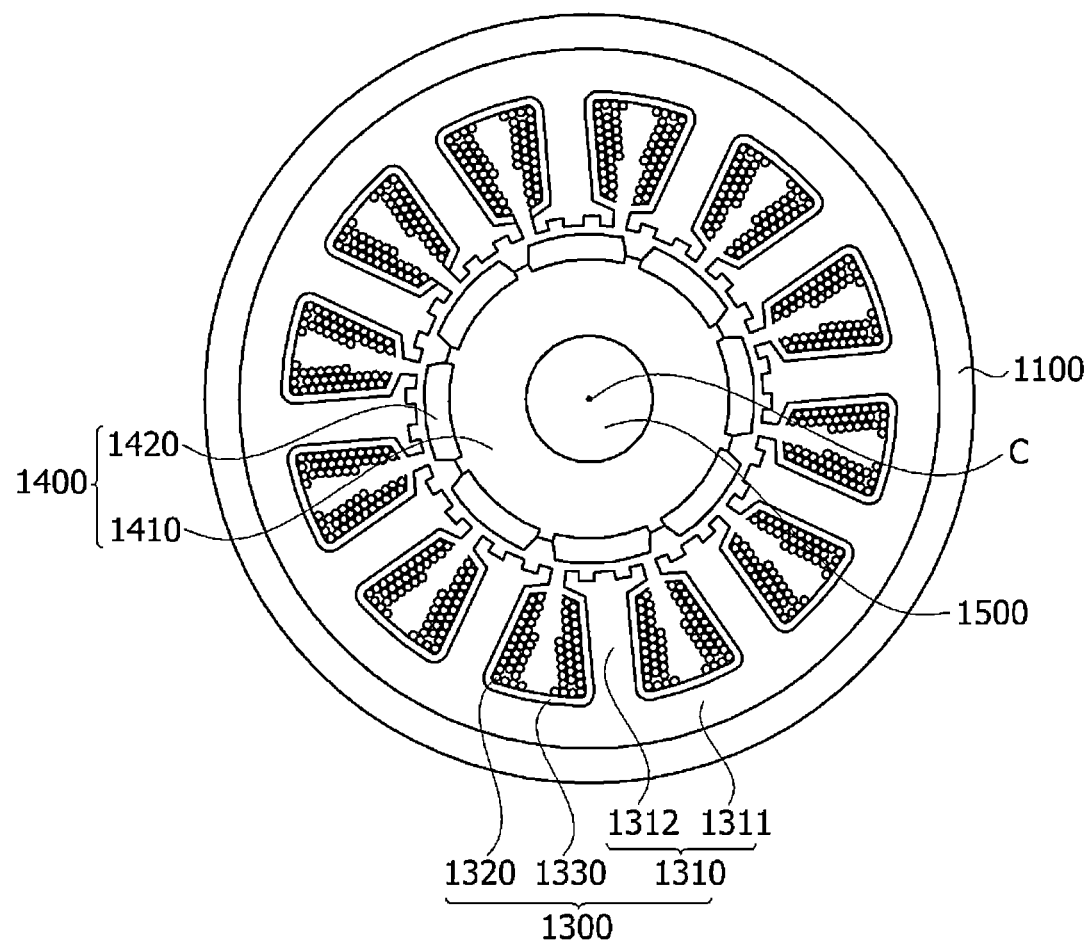
FIG. 19 is a cross-sectional view illustrating the motor according to the second embodiment.

FIG. 18 is a diagram illustrating a motor according to a second embodiment, and FIG. 19 is a cross-sectional view illustrating the motor according to the second embodiment. Here, FIG. 19 is a cross-sectional view taken along line A-A of FIG. 18. In FIG. 18, a y-direction means the axial direction, and an x-direction means the radial direction. Further, the axial direction is perpendicular to the radial direction.

Referring to FIGS. 18 and 19, a motor 1a according to the second embodiment may include a housing 1100, a cover 1200, a stator 1300 disposed on an inner side of the housing 1100, a rotor 1400 disposed on an inner side of the stator 1300, a shaft 1500 coupled to the rotor 1400, and the sensing part 1600. Here, the inner side means a direction disposed toward the center C based on toe radial direction, and an outer side means a direction opposite to the inner side.

The housing 1100 and the cover 1200 may form an outer shape of the motor 1a. Here, the housing 1100 may be formed in a cylindrical shape having an opening formed on an upper portion of the housing 110.

The cover 1200 may be disposed to cover the open upper portion of the housing 1100.

Therefore, the housing 1100 is coupled to toe cover 1200 so that an accommodation space may be formed in the inner side of the housing 1100. Further, as shown in FIG. 19, toe stator 1300, the rotor 1400, the shaft 1500, and the sensing part 1600 may be disposed in the accommodation space.

The housing 1100 may be formed in a cylindrical shape. A pocket for accommodating a bearing 10 for supporting a lower portion of the shaft 1500 may be provided in a lower portion of the housing 1100. Further, a pocket for accommodating a bearing 10 for supporting an upper portion of the shaft 1500 may be provided even in the cover 1200 disposed in the upper portion of the housing 1100.

The stator 1300 may be supported on an inner circumferential surface of the housing 1100. Further, the stator 1300 is disposed on an outer side of the rotor 1400. That is, the rotor 1400 may be disposed on the inner side of the stator 1300.

Figure 20:
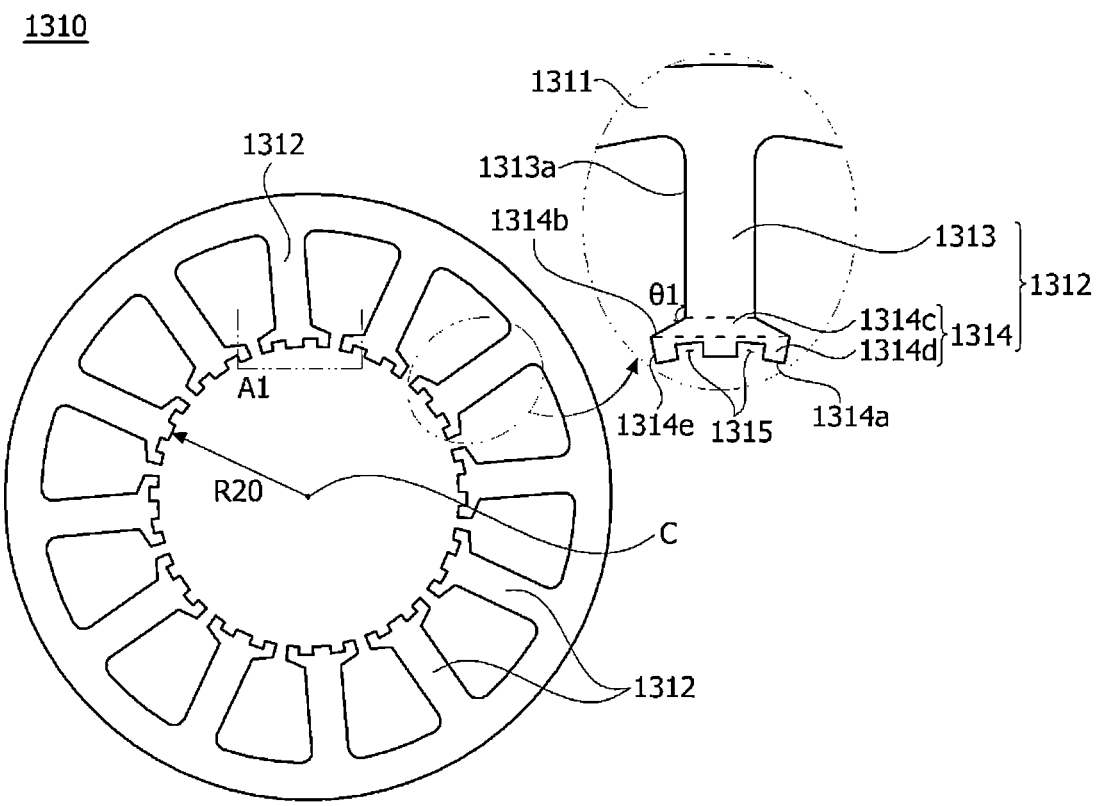
FIG. 20 is a cross-sectional view illustrating a stator of the motor according to the second embodiment.
Figure 21:
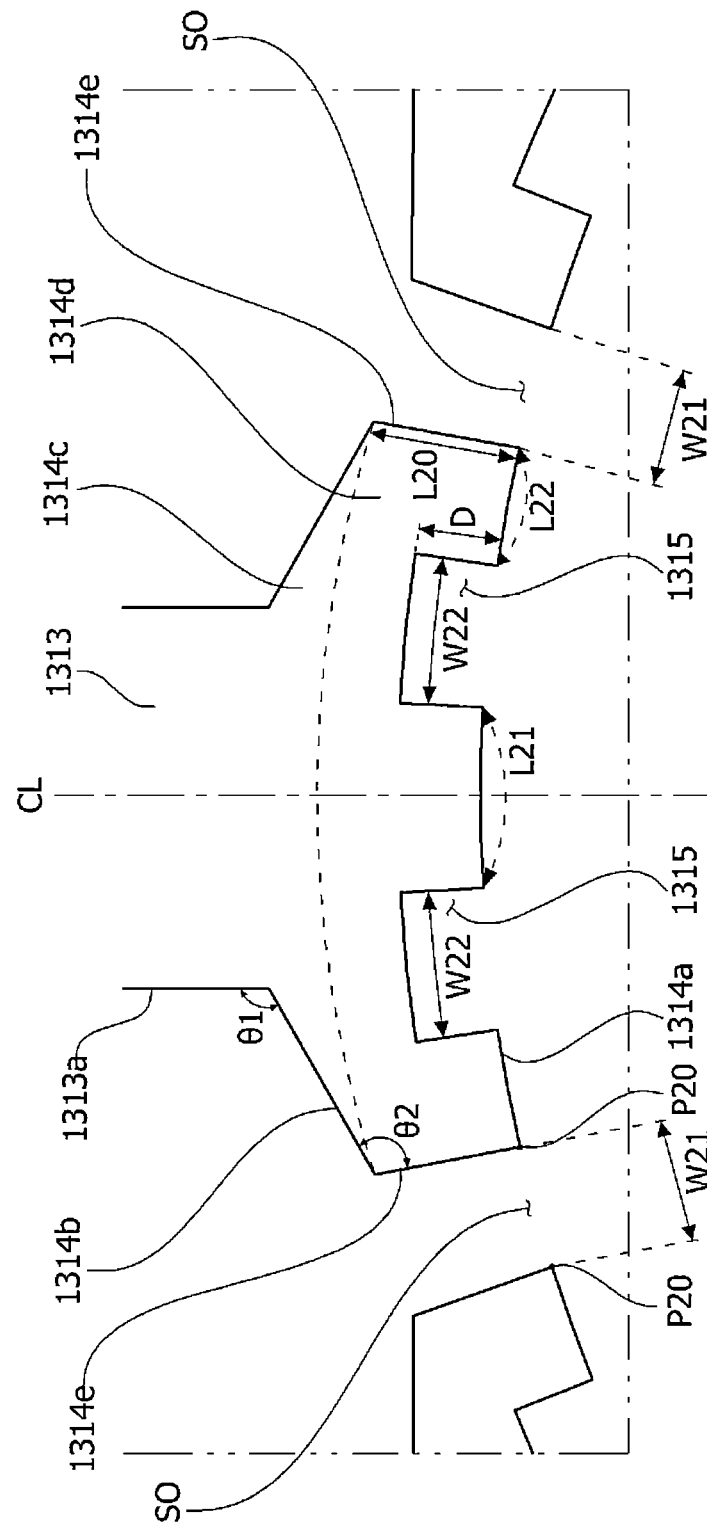
FIG. 21 is an enlarged view illustrating Region A1 of FIG. 3.

FIG. 20 is a cross-sectional view illustrating the stator of the motor according to the second embodiment, and FIG. 21 is an enlarged view illustrating Region A1 of FIG. 20.

Referring to FIGS. 18 to 21, the stator 1300 may include a stator core 1310, a coil 1320 wound around the stator core 1310, and an insulator 1330 disposed between the stator core 1310 and the coil 1320.

The coil 1320 forming a rotating magnetic field may be wound around the stator core 1310. Here, the stator core 1310 may be formed of one core or by coupling a plurality of divided cores.

Further, the stator core 1310 may be formed by stacking a plurality of plates in the form of a thin steel sheet, but the present invention is not necessarily limited thereto. For example, the stator core 1310 may be formed of a single product.

The stator core 1310 may include a yoke 1311 and a plurality of teeth 1312.

The yoke 1311 may be formed in a cylindrical shape. Thus, the yoke 1311 may include a ring-shaped cross section.

The tooth 1312 may be disposed to protrude from the yoke 1311 in the radial direction (x direction) based on a center C. Further, the plurality of teeth 1312 may be disposed to be spaced apart from each other on an inner circumferential surface of the yoke 1311 in a circumferential direction. Thus, a slot which is a space in which the coil 1320 may be wound may be formed between the teeth 1312. In this case, the teeth 1312 may be provided as twelve teeth, but the present invention is not necessarily limited thereto.

The tooth 1312 may be disposed to face a magnet 1420 of the rotor 1400. In this case, an inner surface 1314a of the tooth 1312 is disposed to be spaced a predetermined distance from an outer circumferential surface of the magnet 1420 based on the radial direction. Here, the inner surface 1314a may be formed with a predetermined curvature 1/R20 based on the center C of the motor 1a. Accordingly, a length of the inner surface 1314a may be obtained by a formula for calculating a length of an arc.

The coil 1320 is wound around each of the teeth 1312.

Referring to FIG. 20, the tooth 1312 may include a body part 1313 around which the coil 1320 is wound, a protrusion 1314 disposed on an end portion of the body part 1313, and a groove 1315 formed to be concave on the inner surface 1314a of the protrusion 1314. In this case, the protrusion 1314 may include a first region 1314c in which a first surface 1314b is formed and a second region 1314d protruding inward from die first region 1314c based on the radial direction. Here, the body part 1313 may be referred to as a body, and the protrusion 1314 may be referred to as a shoe.

The body part 1313 may be disposed to protrude from the yoke 1311 in the radial direction (x direction) based on the center C. Further, the body parts 1313 may be disposed to be spaced apart from each other on the inner circumferential surface of the yoke 1311 in the circumferential direction.

Further, the coil 1320 may be wound around the body part 1313.

The protrusion 1314 may extend to protrude inward from die end portion of the body part 1313.

Referring to FIGS. 20 and 21, the protrusions 1314 are disposed to be spaced apart from each oilier so that an opening may be formed at an inner side of the slot. Here, the opening means the SO. For example, the SO may indicate between one end of the protrusion 1314 of one tooth 1312 among the plurality of teeth 1312 and the other end of the protrusion 1314 of another tooth 1312 adjacent to the one tooth 1312.

Thus, the SO means a space between an end point P20 of one protrusion 1314 and an end point P20 of another protrusion 1314 disposed adjacent to the one protrusion 1314. The SO may be disposed to have a predetermined distance W21. The distance W21 of the SO may be referred to as a distance between the protrusions 1314 or referred to as a width of the SO.

As shown in FIG. 20, the protrusion 1314 may include the first region 1314c in which the first surface 1314b is formed and the second region 1314d based on the radial direction. Further, the groove 1315 may be formed in the second region 1314d including the inner surface 1314a and a second surface 1314c. Here, the inner surface 1314a of the protrusion 1314 may be formed with the predetermined curvature 1/R20 based on the center C of the motor 1a.

Further, a side surface of the protrusion 1314 may include the first surface 1314b extending from the body part 1313 and the second surface 1314c extending from the first surface 1314b.

The first surface 1314b of the first region 1314c may be formed to have a first inclination θ1 with respect to the side surface 1313a of the body part 1313. Further, the second surface 1354e of the second region 1314d may be formed to have a second inclination θ2 with respect to the first surface 1314b.

As shown in FIG. 21, the first inclination θ1 may be an obtuse angle of an outer side between the side surface 1313a and die first surface 1314b of the body part 1313. Further, the second inclination θ2 may be an obtuse angle of an inner side between the first surface 1314b and the second surface 1314e.

In this case, the first inclination θ1 may be different from the second inclination θ2, but the present invention is not necessarily limited thereto. For example, in consideration of performance and a cogging torque of the motor 1a due to the teeth 1312, the first inclination θ1 and the second inclination θ2 may be the same inclination.

The first region 1314c is a region connected to the end portion of the body part 1313 and may include the first surfaces 1314b formed at both sides based on the circumferential direction. As shown in FIG. 20, the first region 1314c is disposed between the body part 1313 and the second region 1314d.

Referring to FIGS. 20 and 21, the first inclination θ1 between the body part 1313 and the protrusion 1314 may range from 145° to 155°. As shown in FIG. 21, the first inclination 61 between the side surface 1313a of the body part 1313 and the first surface 1314b of the protrusion 1314 may range from 145° to 155°.

Figure 22:
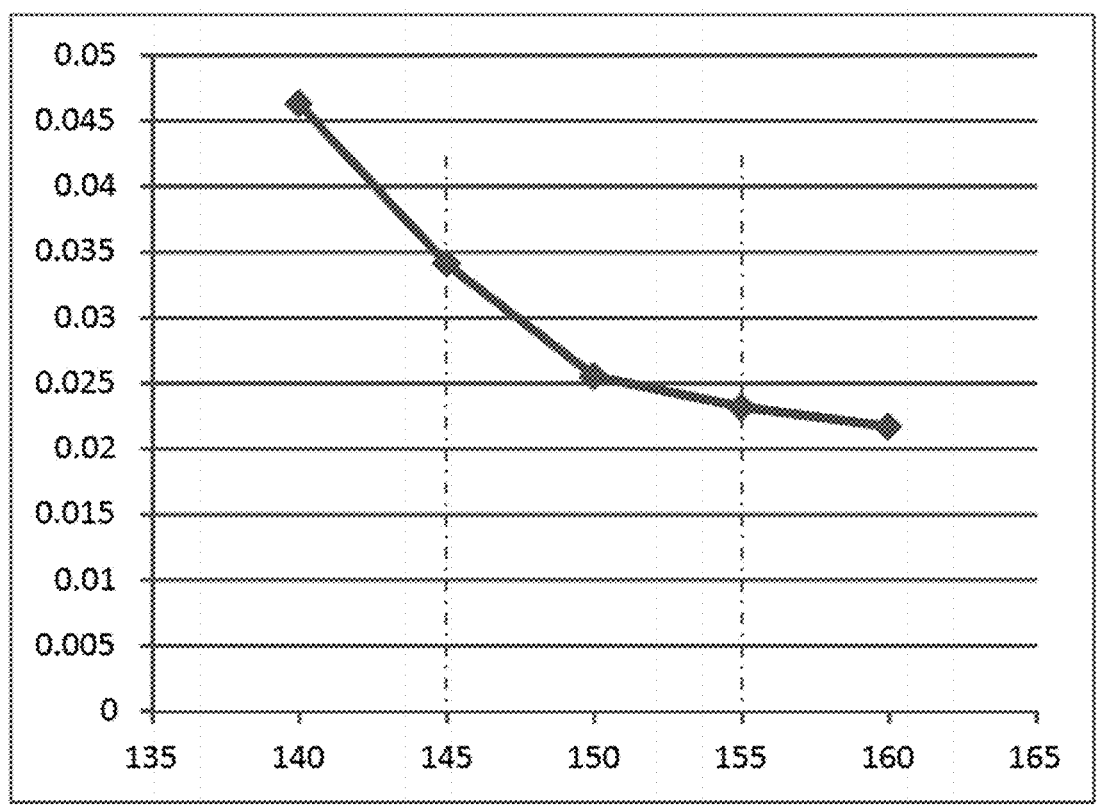
FIG. 22 is a graph showing a variation in cogging torque according to an angle between a body part and a protrusion of a stator core disposed in the motor according to the second embodiment.

FIG. 22 is a graph showing a variation in cogging torque according to an angles between the body part and the protrusion of a stator core disposed in the motor according to the second embodiment.

Referring to FIG. 22, it can be seen that the cogging torque is significantly reduced within a range from 145° to 155° of the first inclination θ1 between the side surface 1313a of the body part 1313 and the first surface 1314b of the protrusion 1314.

FIGS. 23A-23D show graphs illustrating a variation in cogging torque waveform according to a first inclination between the body part and the protrusion of the stator core disposed in the motor according to the second embodiment.

As the first inclination θ1 between the side surface 1313a of the body part 1313 and the first surface 1314b of the protrusion 1314 is decreased from 145° to 155°, it can be confirmed that an amplitude of the cogging torque waveform was gradually decreased.

The second region 1314d is a portion of the protrusion 1314 extending inward from the first region 1314c. As shown in FIG. 20, the second region 1314d may include the inner surface 1314a on which the groove 1315 is formed and the second surface 1314e.

In this case, the second region 1314d may be formed to have a predetermined length L20.

The length L20 may be a length of the second surface 1314c. Specifically, the length L20 may be provided as a length from an inner edge of the first surface 1314b to an edge of one side of the inner surface 1314a.

Further, the length L20 of the second surface 1314e may be ¼ of the distance W21 of the SO based on the radial direction. In this case, the length L20 may be referred to as a depth of live protrusion 1314.

The groove 1315 may be formed to be concave outward on the inner surface 1314a based on the radial direction.

As shown in FIGS. 20 and 21, two cross sections of the grooves 1315 in a direction perpendicular to the axial direction of the shaft 1500 have been shown as two examples having a rectangular shape, but the present invention is not necessarily limited thereto. For example, in consideration of the cogging torque, the groove 1315 may be formed as one groove 1315 or two or more grooves 1315. Alternatively, the groove 1315 may be formed in a semicircular shape having a predetermined radius or formed in a parabolic shape.

Referring to FIG. 21, the groove 1315 may be formed in a quadrangular shape having a predetermined width W22 based on the circumferential direction and a predetermined depth D based on the radial direction.

The two grooves 1315 may be symmetrically disposed based on a reference line CL passing through a center of the width of the protrusion 1314 and a center of the body part 1313 based on the circumferential direction.

Further, a first distance L21 between the grooves 1315 formed on the inner surface 1314a based on the circumferential direction may be equal to a second distance L22 from one end of the protrusion 1314 to the groove 131$. In this case, tire first distance L21 and the second distance L22 may be distances on the inner surface 1314a in the circumferential direction.

Owing to the width W22 of the groove 1315, the cogging torque of the motor 1a may be decreased.

The width W22 of the groove 1315 may be 0.85 to 1.1 times a distance between one end of one protrusion 1314 among tire plurality of teeth 1312 and one end of another protrusion 1314 among the plurality of teeth 1312 adjacent to the one protrusion 1314. For example, the width W22 of the groove 1315 may be 0.85 to 1.1 times the distance W21 of the SO formed between the protrusions 1314. That is, this may be represented as distance W21:width W22=1:0.85 to 1.1.

Figure 25:
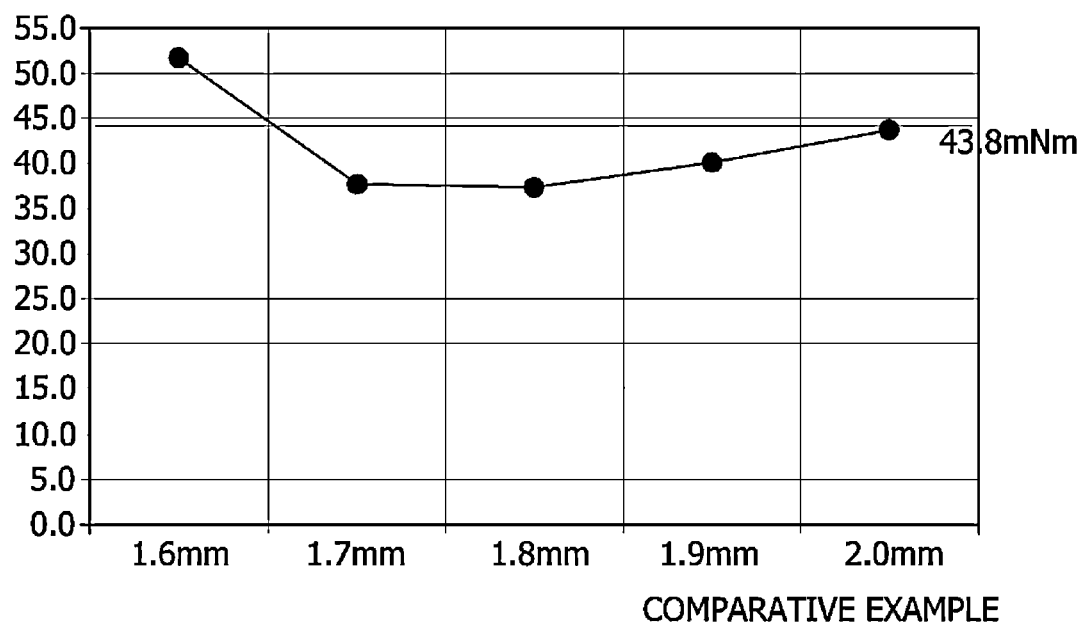
FIG. 25 is a graph showing the cogging torque when the width of the groove is 0.85 to 0.95 times the width of the SO in the motor according to the second embodiment.
Figure 26:
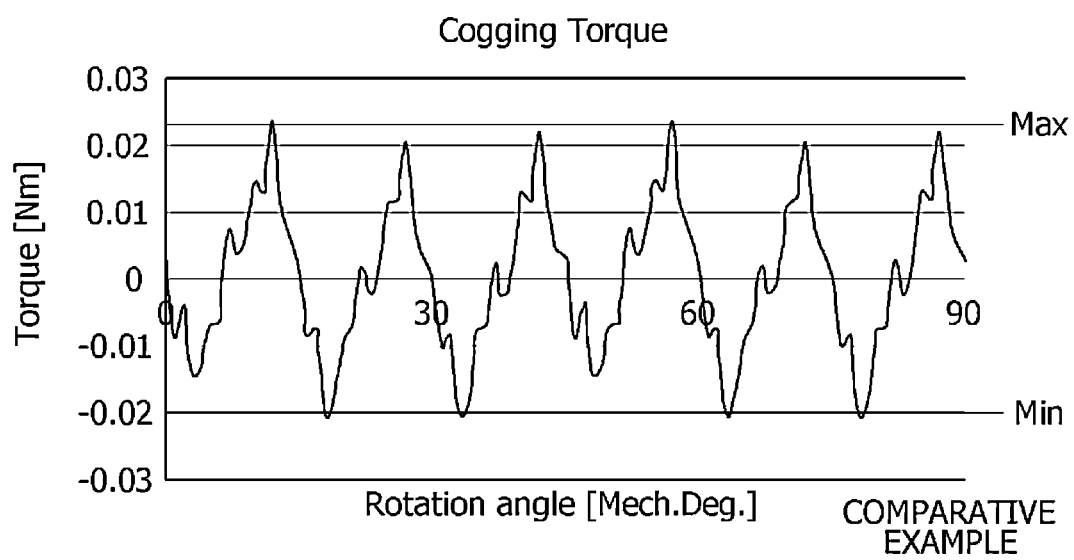
FIG. 26 is a graph showing a cogging torque waveform of a motor of Comparative Example.
Figures 27, 28:
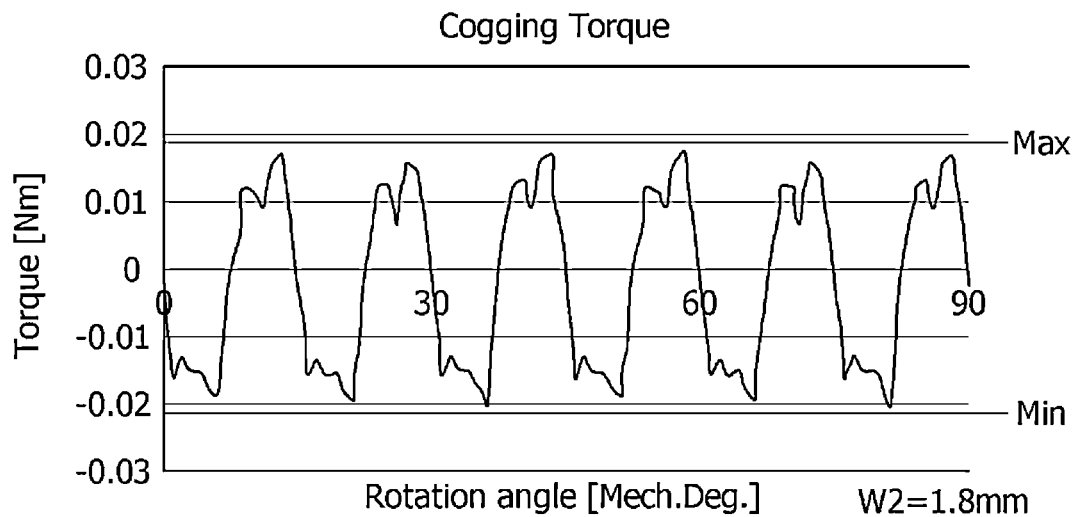
FIG. 27 is a graph showing a cogging torque waveform of the motor according to the second embodiment when the width of the groove is 0.9 times the width of the SO.
FIG. 28 is a table showing variations in cogging torque and torque when the width of the groove is 1.05 to 1.1 times the width of the SO in the motor according to the second embodiment.

FIG. 24 is a table showing variations in cogging torque and torque when the width of the groove is 0.85 to 0.95 times the width of the SO in the motor according to the second embodiment, FIG. 25 is a graph showing the cogging torque when the width of the groove is 0.85 to 0.95 times the width of the SO in the motor according to the second embodiment, FIG. 26 is a graph showing a cogging torque waveform of a motor of Comparative Example, and FIG. 27 is a graph showing a cogging torque waveform of the motor according to the second embodiment when the width of the groove is 0.9 times the width of the SO. Here, the motor provided as Comparative Example is a case in which the width of the OS is equal to that of the groove, and the widths of the SO and the groove may be provided as 2 mm. Further, a depth of the groove is 0.5 mm. In this case, a value of 43.8 mN in FIG. 25 represents the cogging torque of the motor of Comparative Example.

The width W22 of the groove 1315 may be formed within a range of 0.85 to 0.95 times the distance W21 of the SO. That is, this may be represented as distance W21:width W22=1:0.85 to 0.95.

Referring to FIGS. 24 and 25, the cogging torque of the motor 1a according to the second embodiment may be maximally reduced by 14.6% (W22=1.8 mm) as compared with the motor of the Comparative Example. For example, it can be confirmed that the cogging torque of the motor 1a was reduced until the width W22 of the groove 1315 of the motor 1a reached 1.8 mm and was increased again. In this case, it can be confirmed that a variance in torque of the motor 1a according to the second embodiment is not significant as compared with a result value of 5.94 Nm which is a torque of the motor of Comparative Example.

FIG. 26 is a graph showing pulsation of a cogging torque (repetitive torque waveform) of the motor of Comparative Example, and FIG. 27 is a graph showing pulsation of a cogging torque (repetitive torque waveform) of the motor according to the second embodiment. Referring to FIGS. 26 and 27, it can be confirmed that an amplitude between a maximum value and a minimum value of the cogging torque of the motor 1a were smaller than an amplitude between a maximum value and a minimum value of the cogging torque of the motor of Comparative Example.

Figure 29:
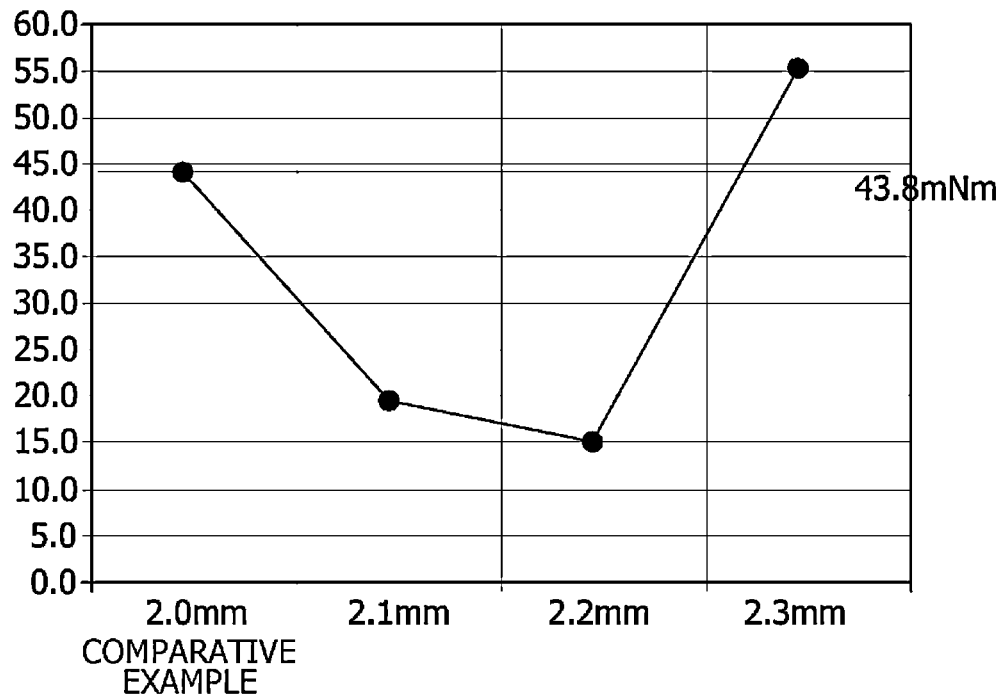
FIG. 29 is a graph showing variations in the cogging torque when the width of the groove is 1.05 to 1.1 times the width of the SO in the motor according to the second embodiment.
Figure 30:
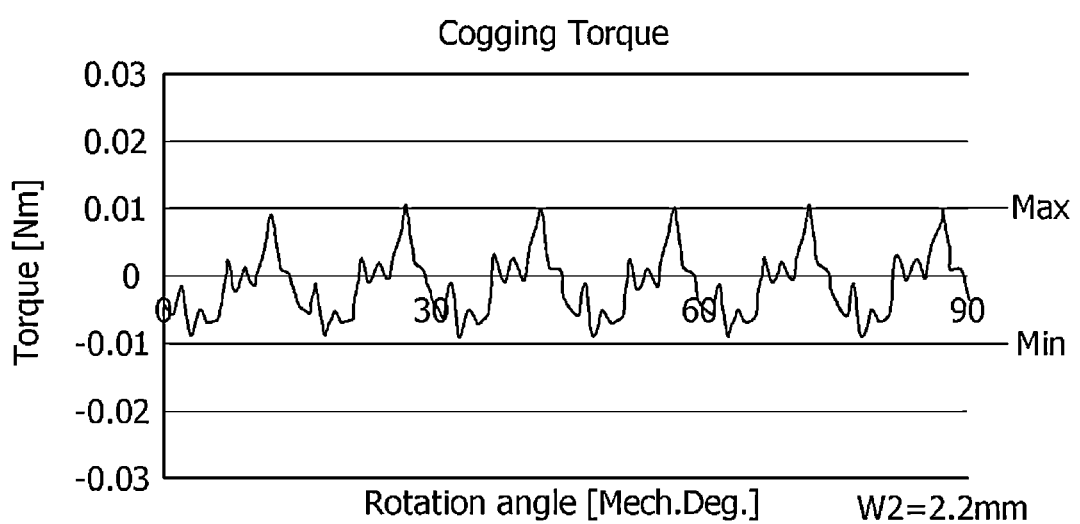
FIG. 30 is a graph showing a cogging torque waveform of the motor according to the second embodiment when the width of the groove is 1.1 times the width of the SO.

FIG. 28 is a table showing variations in cogging torque and torque when the width of the groove is 1.05 to 1.1 times the width of the SO in die motor according to the second embodiment, FIG. 29 is a graph showing variations in the cogging torque when the width of the groove is 1.05 to 1.1 times the width of the SO in the motor according to the second embodiment, and FIG. 30 is a graph showing a cogging torque waveform of the motor according to the second embodiment when the width of the groove is 1.1 times the width of the SO.

The width W22 of the groove 1315 may be formed within a range of 1.05 to 1.1 times the distance W21 of the SO. That is, this may be represented as distance W21:width W22=1:1.05 to 1.1.

Referring to FIGS. 28 and 29, the cogging torque of the motor 1a according to the second embodiment may be reduced by 66.7% (W2=2.2 mm) at most as compared with the motor of Comparative Example. For example, it can be confirmed that the cogging torque of the motor 1a was reduced until the width W22 of the groove 1315 of the motor 1a reached 2.2 mm and was increased again. In this case, it can be confirmed that a variance in torque of the motor 1a according to the second embodiment is not significant as compared with a result value of 5.94 Nm which is a torque of the motor of Comparative Example.

FIG. 30 is a graph showing the pulsation of the cogging torque (repetitive torque waveform) of the motor according to the second embodiment. Referring to FIGS. 26 and 30, it can be confirmed that an amplitude between the maximum value and the minimum value of the cogging torque of the motor 1a were smaller than the amplitude between the maximum value and the minimum value of the cogging torque of the motor of Comparative Example.

Thus, when the width W22 of the groove 1315 is 1.05 to 1.1 times a distance between one end of one protrusion 1314 among the plurality of teeth 1312 and one end of another protrusion 1314 among the plurality of teeth 1312 adjacent to the one protrusion 1314, the cogging torque is effectively reduced so that quality of the motor 1a may be improved.

In particular, when the width W22 of the groove 1315 is 2.2 mm, the cogging torque of the motor 1a is maximally decelerated. That is, when the width W22 of the groove 1315 is 1.1 limes the distance W21 of the SO, the cogging torque of the motor 1a is maximally decelerated.

Owing to the depth D of the groove 1315, the cogging torque of the motor 1a may be decreased.

The depth D of the groove S315 may be 0.7 to 1.3 times the length L20 of the second surface 1314c based on the radial direction. For example, the depth D of the groove 1315 may be formed within a range of 0.7 to 1.3 times the length L20 from an edge of one side of the first surface 1314b of the protrusion 1314 to the inner surface 1314a. That is, this may be represented as length L20:depth D1:0.7 to 1.3.

Further, since the length L20 of the second surface 1314c may be provided as ¼ of the distance W21 of the SO based on the radial direction, the depth D of the groove 1315 may be formed in a range of 0.175 to 0.325 times the distance W21 of the SO formed between the protrusions 1314 based on the radial direction.

Figures 31, 32:
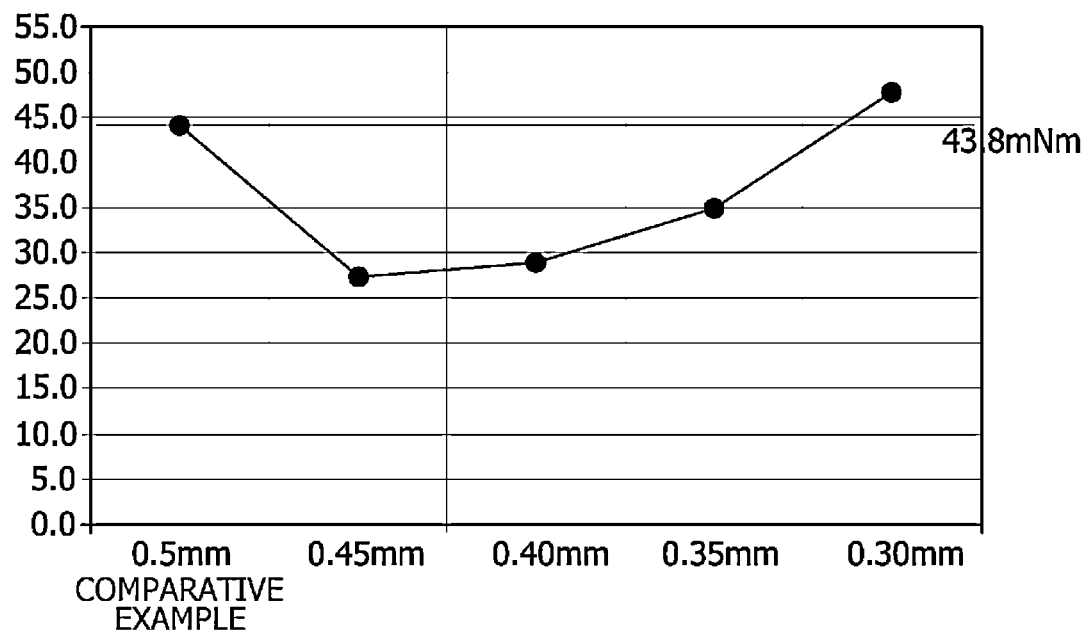
FIG. 31 is a table showing variations in cogging torque and torque when a depth of the groove is 0.7 to 0.9 times a length of a second surface in a radial direction in the motor according to the second embodiment.
FIG. 32 is a graph showing the cogging torque when the depth of the groove is 0.7 to 0.9 times the length of the second surface in the radial direction in the motor according to the second embodiment.
Figures 33, 34:
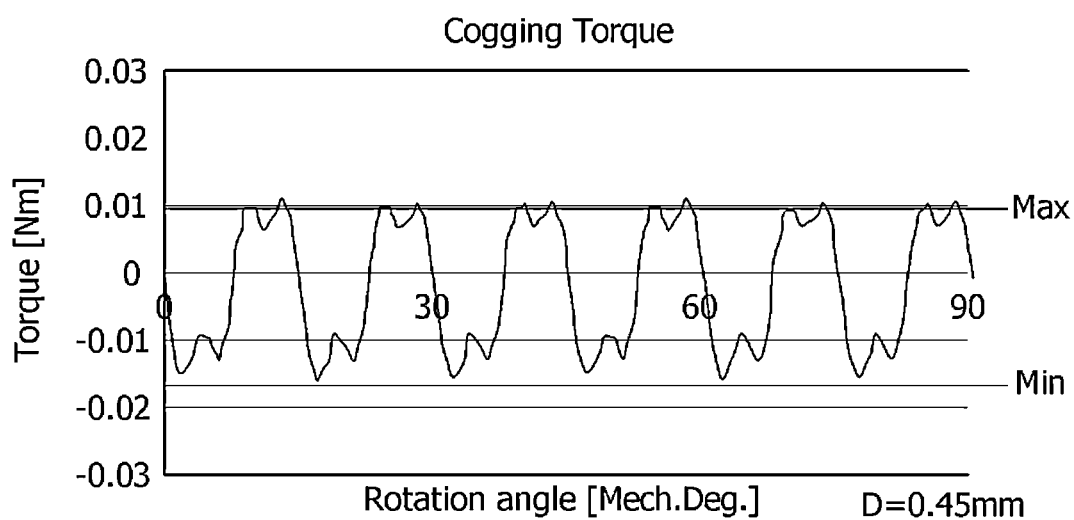
FIG. 33 is a graph showing a cogging torque waveform when the depth of the groove is 0.9 times the length of the second surface in the radial direction in the motor according to the second embodiment.
FIG. 34 is a table showing variations in cogging torque and torque when the depth of the groove is 1.1 to 1.3 times the length of the second surface in the radial direction in the motor according to the second embodiment.

FIG. 31 is a table showing variations in cogging torque and torque when the depth of the groove is 0.7 to 0.9 times the length of the second surface in the radial direction in the motor according to the second embodiment, FIG. 32 is a graph showing the cogging torque when the depth of the groove is 0.7 to 0.9 times the length of the second surface in the radial direction in the motor according to the second embodiment, and FIG. 33 is a graph showing a cogging torque waveform when tire depth of the groove is 0.9 times the length of tire second surface in the radial direction in the motor according to the second embodiment. Mere, the motor provided as Comparative Example is a ease in which the depth of the protrusion is equal to that of the groove, and the length of the second surface and the dept of the groove may be provided as 0.5 mm. In this case, a value of 43.8 mN in FIG. 32 represents the cogging torque of the motor of Comparative Example. 1116 depth D of the groove 1315 may be formed within a range of 0.7 to 0.9 times the distance L20 of the second surface 1314e. That is, this may be represented as length L20:depth D=1:0.7 to 0.9.

Further, when the length L20 of the second surface 1314e is ¼ of the distance W21 of the SO, the depth D of the groove 1315 may be formed within a range of 0.175 to 0.225 limes the distance W21 of the SO.

Referring to FIGS. 31 and 32, the cogging torque of the motor 1a according to the second embodiment may be maximally reduced by 37.9% (D=0.45 mm) as compared with the motor of Comparative Example. For example, it can be confirmed that the cogging torque of the motor 1a was reduced until the depth D of the groove 1315 of the motor 1a reached 0.45 mm and was increased again. In this case, it can be confirmed that a variance in torque of the motor 1a according to the second embodiment is not significant as compared with a result value of 5.94 Nm which is a torque of the motor of Comparative Example.

FIG. 33 is a graph showing the pulsation of the cogging torque (repetitive torque waveform) of the motor according to the second embodiment. Referring to FIGS. 26 and 33, it can be confirmed that an amplitude between a maximum value and a minimum value of the cogging torque of the motor 1a were smaller than the amplitude between a maximum value and a minimum value of the cogging torque of the motor of Comparative Example.

Figure 35:
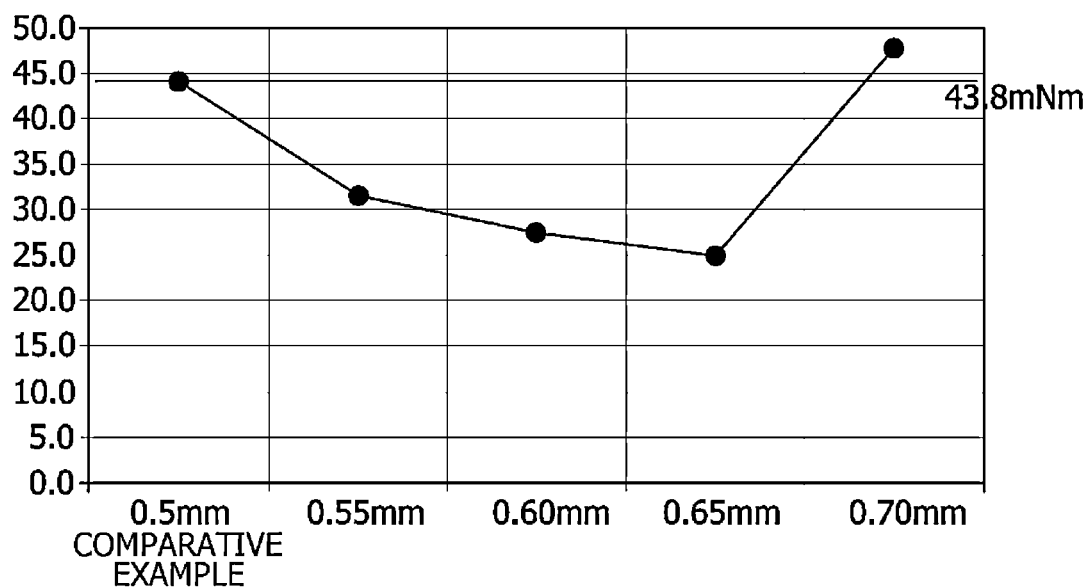
FIG. 35 is a graph showing the cogging torque when the depth of the groove is 1.1 to 1.3 times the length of the second surface in the radial direction in the motor according to the second embodiment.
Figure 36:
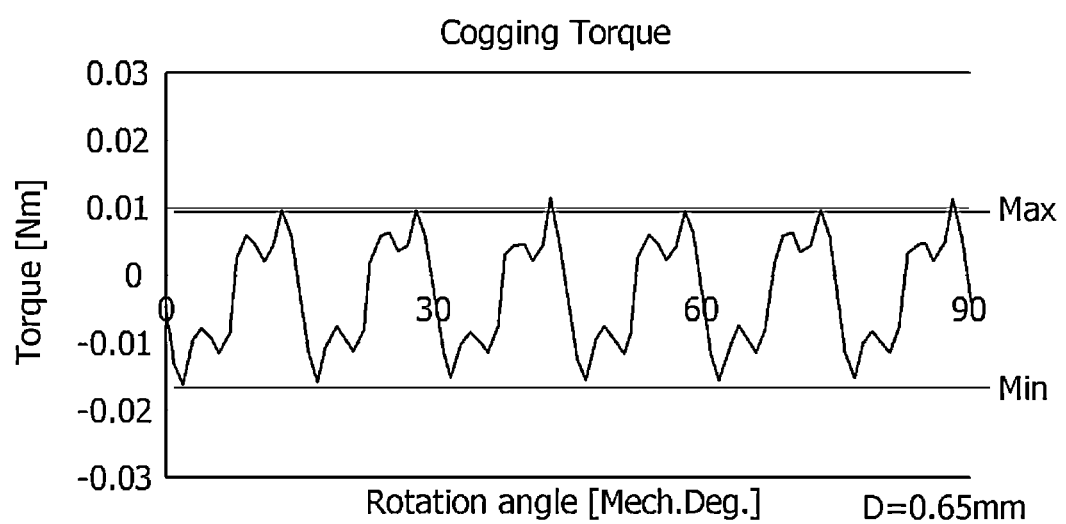
FIG. 36 is a graph showing a cogging torque waveform when the depth of the groove is 1.3 times the length of the second surface in the radial direction in the motor according to the second embodiment.

FIG. 34 is a table showing variations in cogging torque and torque when the depth of the groove is 1.1 to 1.3 times the length of the second surface in the radial direction in the motor according to the second embodiment, FIG. 35 is a graph showing the cogging torque when the depth of the groove is 1.1 to 1.3 times the length of the second surface in the radial direction in the motor according to the second embodiment, and FIG. 36 is a graph showing a cogging torque waveform when the depth of the groove is 1.3 times the length of the second surface in the radial direction in the motor according to the second embodiment.

The depth D of the groove 1315 may be formed within a range of 1.1 to 1.3 times the distance L20 of the second surface 1314e. That is, this may be represented as length L20:depth D=1:1.1 to 1.3.

Further, when the length L20 of the second surface 1314c is ¼ of the distance W21 of the SO, the depth D of the groove 1315 may be formed within a range of 0.275 to 0.325 times the distance W21 of the SO.

Referring to FIGS. 34 and 35, the cogging torque of the motor 1a according to the second embodiment may be maximally reduced by 42.0% (D=0.65 mm) as compared with the motor of Comparative Example. For example, it can be confirmed that the cogging torque of the motor is was reduced until the depth D of the groove 1315 of the motor 1a reached 0.65 mm and was increased again. In this case, it can be confirmed that a variance in torque of the motor 1a according to the second embodiment is not significant as compared with a result value of 5.94 Nm which is a torque of the motor of Comparative Example.

FIG. 36 is a graph showing the pulsation of the cogging torque (repetitive torque waveform) of the motor according to the second embodiment. Referring to FIGS. 26 and 36, it can be confirmed that an amplitude between a maximum value and a minimum value of the cogging torque of the motor 1a were smaller than the amplitude between a maximum value and a minimum value of the cogging torque of the motor of Comparative Example.

Figures 37, 38:
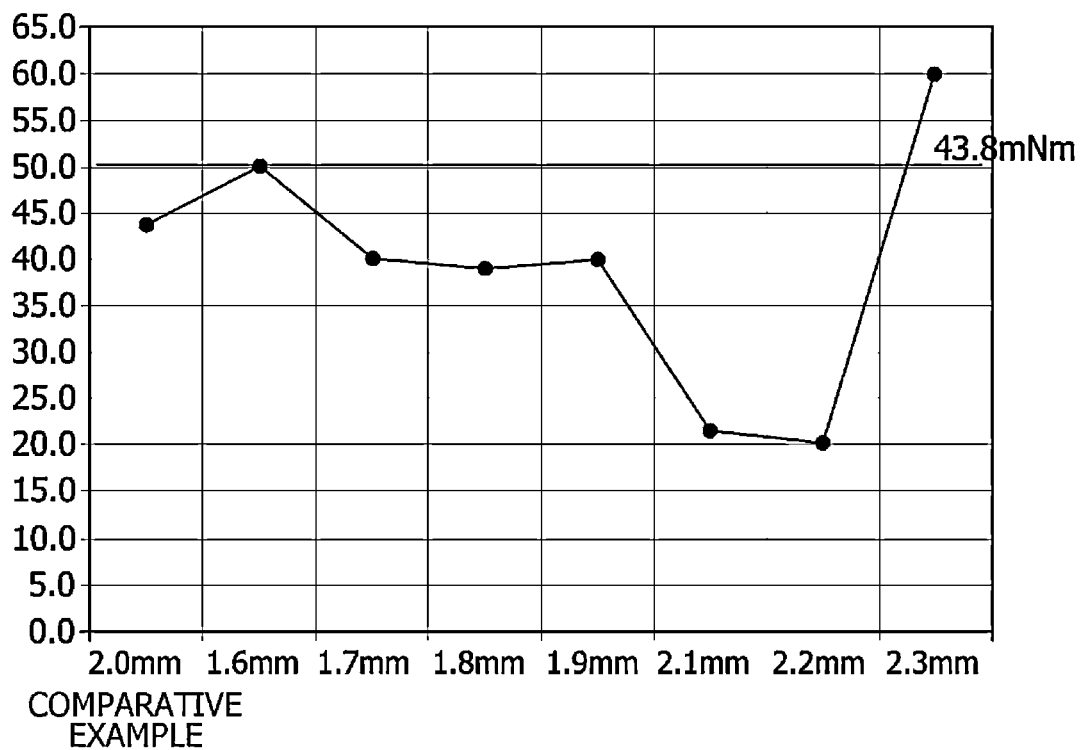
FIG. 37 is a table showing variations in cogging torque and torque when the depth of the groove is 0.65 mm and the width of the groove is 0.85 to 1.1 times the width of the SO in the motor according to the second embodiment.
FIG. 38 is a graph showing the cogging torque when the depth of the groove is 0.65 mm and the width of the groove is 0.85 to 1.1 times the width of the SO in the motor according to the second embodiment.
Figures 39, 40:
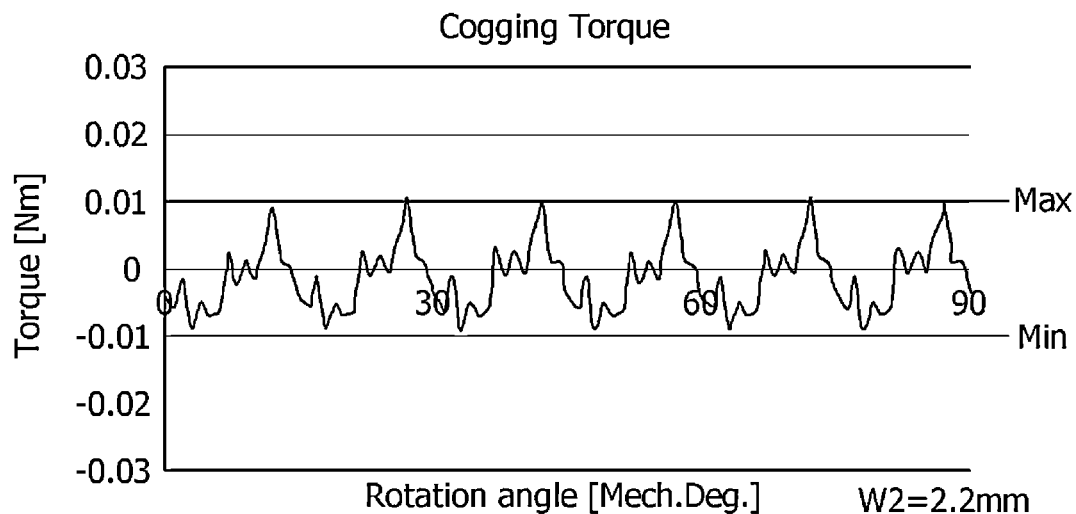
FIG. 39 is a graph showing a cogging torque waveform when the depth of the groove is 0.65 mm and the width of the groove is 1.1 times the width of the SO in the motor according to the second embodiment.
FIG. 40 is a table showing variations in cogging torque and torque when the width of the groove is 2.2 mm and the depth of the groove is 0.7 to 1.3 times the length of the second surface in the radial direction in the motor according to the second embodiment.

FIG. 37 is a table showing variations in cogging torque and torque when the depth of the groove is 0.65 mm and the width of the groove is 0.85 to 1.1 times the width of the SO in the motor according to the second embodiment, FIG. 38 is a graph showing the cogging torque when the depth of the groove is 0.65 mm and the width of the groove is 0.85 to 1.1 times the width of the SO in the motor according to the second embodiment, and FIG. 39 is a graph showing the cogging torque waveform when the depth of the groove is 0.65 mm and the width of the groove is 1.1 times the width of the SO in the motor according to the second embodiment.

As shown in FIGS. 34 and 35, when the depth D of the groove 1315 is 0.65 mm, the cogging torque is reduced as much as possible. Accordingly, as shown in FIGS. 37 to 39, a variance in cogging torque of the motor 1a according to the width W22 of the groove 1315 can be confirmed based on when the depth D of the groove 1315 is 0.65 mm. That is, the depth D of the groove 1315 of the motor 1a is fixed and thus variations and critical values in cogging torque and torque due to the width W22 of the groove 1315 can be confirmed. In this case, the distance W21 of the SO may be 2 mm, and the length L20 of the second surface 1314e which is the depth of the protrusion 1314 may be 0.5 mm.

Referring to FIGS. 37 and 38, the cogging torque of the motor 1a according to the second embodiment may be maximally reduced by 53.0% (W2=2.2 mm) as compared with the motor of Comparative Example. For example, it can be confirmed that the cogging torque of the motor 1a was reduced until the width W22 of the groove 1315 of the motor 1a reached 2.2 mm and was increased again. In this case, it can be confirmed that a variance in torque of the motor 1a according to the second embodiment is not significant as compared with a result value of 5.94 Nm which is a torque of the motor of Comparative Example.

FIG. 39 is a graph showing the pulsation of the cogging torque (repetitive torque waveform) of the motor according to the second embodiment. Referring to FIGS. 26 and 39, it can be confirmed that an amplitude between a maximum value and a minimum value of the cogging torque of the motor 1a were smaller than the amplitude between a maximum value and a minimum value of the cogging torque of the motor of Comparative Example.

Figure 41:
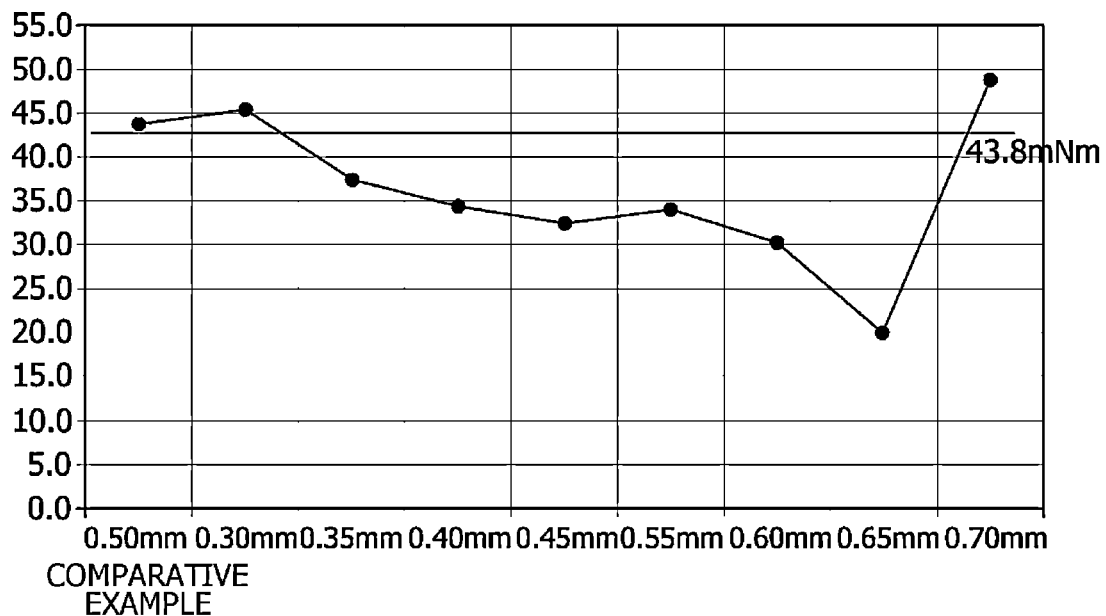
FIG. 41 is a graph showing the cogging torque when the width of the groove is 2.2 mm and the depth of the groove is 0.7 to 1.3 times the length of the second surface in the radial direction in the motor according to the second embodiment.
Figure 42:
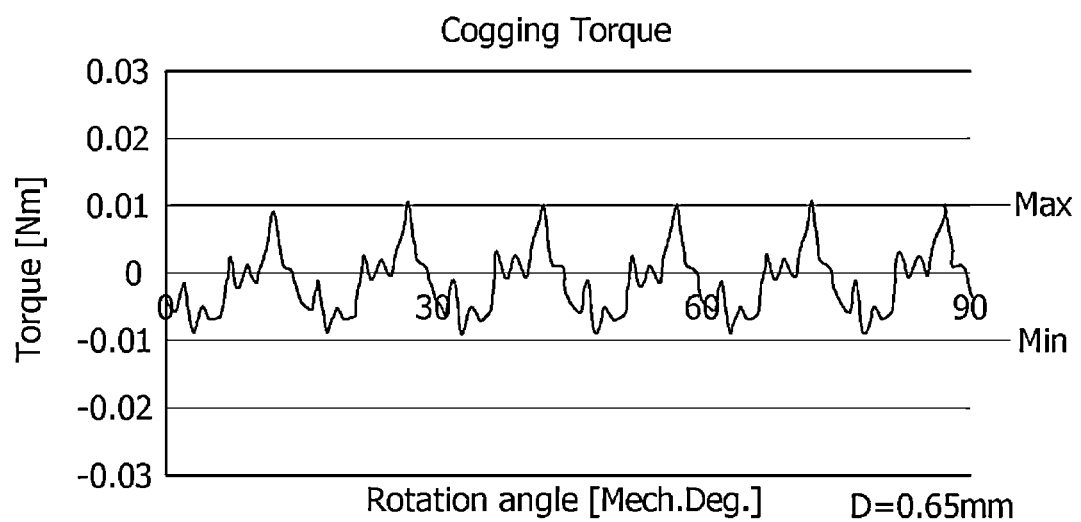
FIG. 42 is a graph showing a cogging torque waveform when the width of the groove is 2.2 mm and the depth of the groove is 1.3 times the length of the second surface in the radial direction in die motor according to the second embodiment.

FIG. 40 is a table showing variations in cogging torque and torque when the width of the groove is 2.2 mm and the depth of the groove is 0.7 to 1.3 times the length of the second surface in the radial direction in the motor according to the second embodiment, FIG. 41 is a graph showing the cogging torque when the width of the groove is 2.2 mm and the depth of the groove is 0.7 to 1.3 times the length of the second surface in the radial direction in the motor according to the second embodiment, and FIG. 42 is a graph showing a cogging torque waveform when the width of the groove is 2.2 mm and the depth of the groove is 1.3 times the length of die second surface in the radial direction in the motor according to the second embodiment.

As shown in FIGS. 28 and 29, when the width W22 of the groove 1315 is 2.2 mm, the cogging torque is reduced as much as possible. Accordingly, as shown in FIGS. 40 to 42, a variance in cogging torque of the motor 1a according to the depth D of the groove 1315 can be confirmed based on when the width W22 of the groove 1315 is 2.2 mm. That is, the width W22 of the groove 1315 of the motor 1a is fixed and thus variations and critical values in cogging torque and torque due to the depth D of the groove 1315 can be confirmed. In this case, the distance W21 of the SO may be 2 mm, and the length L20 of the second surface 1314e which is the depth of the protrusion 1314 may be 0.5 mm.

Referring to FIGS. 40 and 41, the cogging torque of the motor 1a according to the second embodiment may be maximally reduced by 53.4% (D=0.65 mm) as compared with die motor of Comparative Example. For example, it can be confirmed that the cogging torque of the motor 1a was reduced until the depth D of the groove 1315 of the motor 1a reached 0.65 mm and was increased again. In this case, it am be confirmed that a variance in torque of the motor 1a according to the second embodiment is not significant as compared with a result value of 5.94 Nm which is a torque of the motor of Comparative Example.

FIG. 42 is a graph showing the pulsation of the cogging torque (repetitive torque waveform) of the motor according to the second embodiment. Referring to FIGS. 26 and 42, it can be confirmed that an amplitude between a maximum value and a minimum value of the cogging torque of the motor 1a were smaller than the amplitude between a maximum value and a minimum value of the cogging torque of the motor of Comparative Example.

Therefore, it can be confirmed that a variance in cogging torque of the motor 1a is larger due to the width W22 rather than the depth D of the groove 1315. Accordingly, the motor 1a may preferentially reduce the cogging torque by adjusting a size of the width W22 rather than the depth D of the groove 1315.

Further, in the motor 1a, when the width W22 of the groove 1315 is 2.2 mm and the depth D thereof is 0.65 mm, the cogging torque is reduced as much as possible by 53.4%. That is, in the motor 1a, when the width W22 of the groove 1315 is 1.1 times the distance W21 of the SO and tire depth D of the groove 1315 is 1.3 times the depth of the protrusion 1314, the cogging torque is reduced as much as possible.

Here, the length L20 of the second surface 1314e may be provided as a length from an inner edge of the first surface 1314b to an edge of one side of the inner surface 1314a. Further, since the length L20 may be ¼ of the distance W21 of the SO, when the depth D of the groove 1315 is 0.325 times the distance W21 of the SO, the cogging torque is decreased as much as possible.

Meanwhile, live width W22 of the groove 1315 may be 0.85 to 1.1 times the distance W21 of the SO formed between the protrusions 1314, and the depth D of the groove 1315 may be 0.7 to 1.3 times the length L20 of the second surface.

When the depth D of the groove 1315 is 0.65 mm and the width W22 of the groove 1315 ranges from 2.1 to 2.2 mm, the cogging torque of the motor 1a is significantly decreased.

A ratio of the width W22 of the groove 1315 to the depth D thereof may range from 3.23 to 3.38. Accordingly, when the width W22 of the groove 1315 is 3.23 to 3.38 times the depth D of the groove 1315, the cogging torque of the motor 1a is optimally reduced. That is, this may be represented as depth D:width W22 of the groove 1315=1:3.23 to 3.38.

The insulator 1330 isolates the stator core 1310 from the coil 1320. Thus, the insulator 1330 may be disposed between the stator core 1310 and the coil 1320.

Accordingly, the coil 1320 may be wound around the tooth 1312 of the stator core 1310 in which the insulator 1330 is disposed.

The rotor 1400 is disposed on an inner side of the stator 1300. Further, the rotor 1400 may include a hole, into which the shaft 1500 is inserted, at a central portion of the rotor 1400. Thus, the shaft 1500 may be coupled to the groove of the rotor 1400.

Referring to FIG. 19, the rotor 1400 may include a rotor core 1410 and the magnet 1420 disposed on an outer circumferential surface of the rotor core 1410.

The rotor 1400 may be classified into the following types according to a coupling method between the rotor core 1410 and the magnet 1420.

As shown in FIG. 19, the rotor 1400 may be implemented in a type in which the magnet 1420 is coupled to the outer circumferential surface of the rotor core 1410. In such a type of the rotor 1400, in order to inhibit separation of the magnet 1420 and increase a coupling force, a separate can member (not shown) may be coupled to the rotor core 1410. Alternatively, the rotor 1400 may be integrally formed with the magnet 1420 and the rotor core 1410 through dual injection of the magnet 1420 and the rotor core 1410.

Also alternatively, the rotor 1400 may be implemented in a type in which the magnet 1420 is coupled to an interior of the rotor core 1410. Such a type of the rotor 1400 may be provided with a pocket into which the magnet 1420 is inserted into the rotor core 1410.

The rotor core 1410 may be formed by stacking a plurality of plates in the form of a thin steel sheet. Alternatively, the rotor core 1410 may be manufactured in a single core form comprised of a single cylinder.

Also alternatively, the rotor core 1410 may be made in the form in which a plurality of pucks (unit cores) forming a skew angle are stacked.

Further alternatively, the rotor core 1410 may include a hole formed to allow the shaft 1500 to be inserted thereinto.

The magnet 1420 may be provided as eight magnets 1420, but the present invention is not necessarily limited thereto.

The shaft 1500 may be coupled to the rotor 1400. When an electromagnetic interaction occurs in die rotor 1400 and the stator 1300 through a supply of a current, the rotor 1400 rotates and thus the shaft 1500 is rotated by being interlocked with the rotation of the rotor 1400. In this case, the shaft 1500 may be supported on the bearing 10.

The shaft 1500 may be connected to a steering shaft of a vehicle. Thus, the steering shaft may receive power due to a rotation of the shaft 1500.

The sensing part 1600 may detect a magnetic force of the sensing magnet installed to be capable of being rotationally interlocked with the rotor 1400 to determine a current position of the rotor 1400, thereby detecting a rotated position of the shaft 1500.

The sensing part 1600 may include a sensing magnet assembly 1610 and a PCB 1620.

The sensing magnet assembly 1610 is coupled to the shaft 1500 to be interlocked with the rotor 1400 to detect a position of the rotor 1400. In this case, the sensing magnet assembly 1610 may include a sensing magnet and a sensing plate. The sensing magnet may be coaxially coupled to the sensing plate.

The sensing magnet may include a main magnet disposed adjacent to a hole forming an inner circumferential surface in a circumferential direction and a sub-magnet formed at an edge of the main magnet. The main magnet may be arranged equal to a drive magnet inserted into rotor 1400 of the motor. The sub-magnet is more segmented than the main magnet and comprised of many poles. Thus, a rotation angle may be further divided and measured, and driving of the motor may be made smoother.

The sensing plate may be formed of a metal material in the form of a disc. The sensing magnet may be coupled to an upper surface of the sensing plate. Further, the sensing plate may be coupled to the shaft 1500. Here, a hole through which the shaft 1500 passes is formed in the sensing plate.

A sensor for detecting a magnetic force of the sensing magnet may be disposed on the PCB 1620. In this case, the sensor may be provided as a Hall IC. Further, the sensor may generate a sensing signal by detecting a variation in a north pole and a south pole of the sensing magnet.

Although the description has been made with reference to the embodiments of the present invention, it should be understood that various alternations and modifications of the present invention can be devised by those skilled in the art to which the present invention pertains without departing from the spirit and scope of the present invention, which are defined by the appended claims. Further, it should be construed that differences relating to these various alternations and modifications will fall within the scope of the present invention, which are defined by the appended claims.

DESCRIPTION OF REFERENCE NUMERALS 100 and 1500: shaft, 200 and 1400: rotor, 210 and 1410: rotor core, 220 and 1420: magnet, 300 and 1300: stator, 310 and 1310: stator core, 320 and 1320: teeth, 321: body, 322 and 1314: shoe, 323 and 1315: groove, and 330 and 1330: coil

The invention claimed is:
1. A motor comprising:
a shaft;
a rotor to which the shaft is coupled; and
a stator disposed on an outer side of the rotor,
wherein the stator includes a stator core having a plurality of teeth, and a coil wound around each of the teeth, each of the teeth includes a body part around which the coil is wound, a protrusion disposed on an end portion of the body part, and a groove formed to be concave on an inner surface of the protrusion, and a depth (D) of the groove is 0.175 to 0.325 times a distance (W21) between one end of a first protrusion of one tooth among the plurality of teeth and one end of a second protrusion of another tooth adjacent to the one end of the first protrusion of the one tooth, wherein a side surface of the protrusion includes a first surface extending from the body part and a second surface extending from the first surface, and the depth (D) of the groove is 0.7 to 1.3 times a length (L20) of die second surface in a radial direction.

2. The motor of claim 1, wherein:

the rotor includes a cylindrical rotor core and a plurality of magnets disposed to surround an outer circumferential surface of the rotor core, each magnet has an inner circumferential surface in contact with the outer circumferential surface of the rotor core, and, when an angle formed by the outer circumferential surface of the rotor core divided by a number of the magnets is referred to as a first angle, the magnet has a second angle between a first extension line and a second extension line, which extend from two end points of the inner circumferential surface of the magnet to a center point of the rotor core on transverse cross sections of the rotor core and the magnet.

3. The motor of claim 2, wherein, when a curvature radius of an outer circumferential surface of the magnet is referred to as a first radius, and a curvature radius of the inner circumferential surface of the magnet is referred to as a second radius, the rotor has a ratio of the first radius to the second radius ranging from 0.5 to 0.7 on the transverse cross sections of the rotor core and the magnet.

4. The motor of claim 3, wherein a cogging torque waveform has a number of vibrations that is three times the least common multiple of the number of magnets and the number of the teeth during a unit rotation.

5. The motor of claim 1, wherein a ratio of a width (W22) of the groove to the depth (D) of the groove ranges from 3.23 to 3.38.

6. The motor of claim 1, wherein a cross section of the groove perpendicular to an axial direction of the shaft has a quadrangular shape, and the groove is provided as two grooves.

7. The motor of claim 6, wherein two of the grooves are symmetrically disposed based on a reference line (CL) passing through a center of a width of the protrusion in a circumferential direction and a center of the body part.

8. The motor of claim 6, wherein a first distance (L21) between the grooves is equal to a second distance (L22) from one end of the protrusion to the groove.

9. The motor of claim 1, wherein the first surface has a first inclination ($\theta 1$) with respect to a side surface of the body, and the second surface has a second inclination ($\theta 2$) with respect to the first surface, wherein the first inclination ($\theta 1$) is an exterior angle, and the second inclination ($\theta 2$) is an interior angle, and wherein the first inclination ($\theta 1$) is in a range of 145° to 155°.

10. The motor of claim 1, wherein:

the magnets of the rotor are provided as eight magnets; and the teeth of the stator are provided as twelve teeth.

11. The motor of claim 1, wherein a curvature center of an inner circumferential surface of the protrusion coincides with that of the stator core.

12. A motor comprising:

a shaft;

a rotor to which the shaft is coupled; and a stator disposed on an outer side of the rotor, wherein the stator includes a stator core having a plurality of teeth, and a coil wound around each of the teeth, each of the teeth includes a body part around which the coil is wound, a protrusion disposed on an end portion of the body part, and a groove formed to be concave on an inner surface of the protrusion, and a depth (D) of the groove is 0.175 to 0.325 times a distance (W21) between one end of a first protrusion of one tooth among the plurality of teeth and one end of a second protrusion of another tooth adjacent to the one end of the first protrusion of the one tooth, wherein a side surface of the protrusion includes a first surface extending from the body part and a second surface extending from the first surface, wherein the first surface has a first inclination ($\theta 1$) with respect to a side surface of the body, and the second surface has a second inclination ($\theta 2$) with respect to the first surface, wherein the first inclination ($\theta 1$) is an exterior angle, and the second inclination ($\theta 2$) is an interior angle, and wherein the first inclination ($\theta 1$) is in a range of 145° to 155°.

13. The motor of claim 12, wherein:

the rotor includes a cylindrical rotor core and a plurality of magnets disposed to surround an outer circumferential surface of the rotor core, each magnet has an inner circumferential surface in contact with the outer circumferential surface of the rotor core, and, when an angle formed by the outer circumferential surface of the rotor core divided by a number of the magnets is referred to as a first angle, the magnet has a second angle between a first extension line and a second extension line, which extend from two end points of the inner circumferential surface of the magnet to a center point of the rotor core on transverse cross sections of the rotor core and the magnet.

14. The motor of claim 13, wherein, when a curvature radius of an outer circumferential surface of the magnet is referred to as a first radius, and a curvature radius of the inner circumferential surface of the magnet is referred to as a second radius, the rotor has a ratio of the first, radius to the second radius ranging from 0.5 to 0.7 on the transverse cross sections of the rotor core and the magnet.

15. The motor of claim 14, wherein a cogging torque waveform has a number of vibrations that is three times the least common multiple of the number of magnets and the number of the teeth during a unit rotation.

16. The motor of claim 12, wherein a ratio of a width (W22) of the groove to the depth (D) of the groove ranges from 3.23 to 3.38.

17. The motor of claim 12, wherein a cross section of the groove perpendicular to an axial direction of the shaft has a quadrangular shape, and the groove is provided as two grooves.

18. The motor of claim 17, wherein two of the grooves are symmetrically disposed based on a reference line (CL) passing through a center of a width of the protrusion in a circumferential direction and a center of the body part.

19. The motor of claim 17, wherein a first distance (L21) between the grooves is equal to a second distance (L22) from one end of the protrusion to the groove.

20. The motor of claim 12, wherein:
- the magnets of the rotor are provided as eight magnets; and
- the teeth of the stator are provided as twelve teeth.

* * * * *